(12) United States Patent
Umeda et al.

(10) Patent No.: US 7,904,121 B2
(45) Date of Patent: Mar. 8, 2011

(54) GENERATING DEVICE OF TRIGGER SIGNAL

(75) Inventors: Toshiyuki Umeda, Inagi (JP); Shoji Otaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 11/877,077

(22) Filed: Oct. 23, 2007

(65) Prior Publication Data

US 2008/0100491 A1 May 1, 2008

(30) Foreign Application Priority Data

Oct. 27, 2006 (JP) ............... P2006-292581
Sep. 26, 2007 (JP) ............... P2007-250167

(51) Int. Cl.
- H04B 1/16 (2006.01)
- H04B 1/06 (2006.01)
- H04B 1/38 (2006.01)
- H04M 3/00 (2006.01)

(52) U.S. Cl. ........... 455/572; 455/343.3; 455/352; 455/420; 363/84; 363/127

(58) Field of Classification Search .......... 455/527–574, 455/127.5, 343.1–343.4, 333, 41.1, 352, 455/418–420; 340/572.5, 693.1; 363/21.14, 363/52, 84, 127
See application file for complete search history.

(56) References Cited

U.S. PATENT DOCUMENTS

| | | | | |
|---|---|---|---|---|
| 4,422,032 A | * | 12/1983 | Kakumoto et al. | 320/139 |
| 5,173,849 A | * | 12/1992 | Brooks | 363/127 |
| 6,411,148 B1 | * | 6/2002 | Miyashita et al. | 327/227 |
| 7,424,265 B2 | * | 9/2008 | Umeda et al. | 455/41.1 |
| 7,424,266 B2 | * | 9/2008 | Ootaka et al. | 455/41.1 |
| 7,561,866 B2 | * | 7/2009 | Oliver et al. | 455/343.3 |
| 2003/0021158 A1 | * | 1/2003 | Gomez | 365/189.01 |
| 2005/0282505 A1 | | 12/2005 | Umeda et al. | |
| 2006/0128345 A1 | | 6/2006 | Ootaka et al. | |

FOREIGN PATENT DOCUMENTS

| | | |
|---|---|---|
| CN | 1722595 A | 1/2006 |
| EP | 1 560 147 A2 | 8/2005 |
| EP | 1 560 147 A3 | 8/2005 |

(Continued)

OTHER PUBLICATIONS

U.S. Appl. No. 12/040,186, filed Feb. 29, 2008, Sakamoto, et al.

(Continued)

*Primary Examiner* — Simon D Nguyen

(74) *Attorney, Agent, or Firm* — Oblon, Spivak, McClelland, Maier & Neustadt, L.L.P.

(57) ABSTRACT

A trigger signal generating device includes a first power source terminal and a second power source terminal; a first current generator to generate a first current with a first amplitude in accordance with the amplitude of the input signal; a second current generator to generate a second current with a second amplitude, the second current being flowed from the first power source terminal to the second power source terminal; a current mirror circuit to amplify the second current generated from the second current generator to obtain an amplified current; and a trigger signal generator to convert the amplified current into a trigger signal used for triggering a trigger device, the voltage amplitude of the trigger signal being corresponding to the current amplitude of the amplified current; wherein both of the first and second current generators are connected to either one of the first and second power source terminals.

9 Claims, 15 Drawing Sheets

FOREIGN PATENT DOCUMENTS

| | | |
|---|---|---|
| EP | 1 607 900 A2 | 12/2005 |
| JP | 2001-197537 | 7/2001 |
| JP | 2001-197573 | 7/2001 |
| JP | 2002-299970 | 10/2002 |
| JP | 2006-34085 | 2/2006 |
| JP | 2006-54757 | 2/2006 |
| JP | 2006-166415 | 6/2006 |
| JP | 2006-180073 | 7/2006 |
| JP | 2006-319863 | 11/2006 |

OTHER PUBLICATIONS

U.S. Appl. No. 12/364,109, filed Feb. 2, 2009, Nakanishi, et al.
U.S. Appl. No. 12/359,646, filed Jan. 26, 2009, Umeda, et al.
U.S. Appl. No. 12/501,650, filed Jul. 13, 2009, Sakamoto, et al.
U.S. Appl. No. 12/559,821, filed Sep. 15, 2009, Sakamoto, et al.
Extended European Search Report issued Sep. 6, 2010, in Application No. 07254170.9-1248 / 1916532.

* cited by examiner

GENERATING DEVICE OF TRIGGER SIGNAL

CROSS-REFERENCE TO RELATED APPLICATIONS

This application is based upon and claims the benefit of priority from the prior Japanese Patent Applications No. 2006-292581, filed on Oct. 27, 2006 and No. 2007-250167, filed on Sep. 26, 2007; the entire contents of which are incorporated herein by reference.

BACKGROUND OF THE INVENTION

1. Field of the Invention

The present invention relates to a generating device of trigger signal which generates a trigger signal so as to shift the state of an appliance by receiving a radio signal.

2. Description of the Related Art

Such an electrical appliance as a television set can be generally switched on and off with the corresponding remote control. An optical signal emitted from the remote control is received at the electrical appliance so that the electrical appliance is switched on. In order to realize the operation of the switch-on of the electrical appliance, the optical receiver and the electrical power controller in the electrical appliance are always set operable. Namely, even though the electrical appliance is not switched on, some electrical power is always consumed because the optical receiver and the electrical power controller are set operable.

As described above, the remote control uses an optical signal. Since the remote control using the optical signal can be manufactured at low cost, the remote control can not perform the optical communication if an obstacle is located between the remote control and the electrical appliance. In this point of view, such a receiving structure as an RFID tag which utilizes an electromagnetic wave is proposed (refer to Reference 1). In Reference 1, in order to reduce the electric power consumption of the electrical appliance at the standby state thereof, a starting switch is inserted between the rectifier of the RFID tag and the electrical appliance. A power source is provided for the starting switch from the electrical appliance and no power source is provided for the rectifier.

The power source for the electrical appliance is controlled in on-off on the basis of the output state of the starting switch. When the starting switch outputs an off signal, the electrical appliance is switched off so that the electric appliance does not consume the electric power. When the staring switch outputs a signal, the electrical appliance is switched on. For example, with a television set, some images are displayed on the screen and some voices and sounds are created. The power source is provided for the starting switch from the electrical appliance, and the power source may be made from a CMOS inverter. In this case, no electrical current is supplied for the starting switch because the nMOS transistor or pMOS transistor of the inverter is set off irrespective of the operation state of the inverter.

The rectifier receives an external electromagnetic wave with the antenna and then, generates the electric voltage through the electric power originated from the electromagnetic wave. The output voltage of the rectifier becomes large as the input electric power into the rectifier becomes large. Since no electric power is supplied to the rectifier from the electric appliance, the standby electric power of the rectifier becomes zero. By inputting the output voltage of the rectifier into the starting switch, the on-off control signal for the electrical appliance can be generated. As a result, the electric power consumption at standby state of the remote control with the inverter as the power source can be reduced in comparison with the remote controller with the optical signal.

However, since the rectifier can generate a smaller electric voltage through the input of the electric power originated from the electromagnetic wave, the starting switch can not be switched on and off only if a larger electric power is input into the starting switch from the rectifier. Namely, it is required to apply a larger electric power to the RFID tag so that the distance between the electric appliance and the remote control can not be enlarged.

It is proposed in References 2 and 3 to render the electric power to be generated from the rectifier large. According to the improved rectifier disclosed in References 2 and 3, therefore, the operable distance of the remote control can be enlarged to some degrees.

[Reference 1] JP-A 2001-197537 (KOKAI)
[Reference 2] JP-A 2006-034085 (KOKAI)
[Reference 3] JP-A 2006-166415 (KOKAI)

BRIEF SUMMARY OF THE INVENTION

It is an object of the present invention, in view of the above conventional problem, to provide a generating device of trigger signal which is designed so as to shift the state of an appliance through the reception of a radio signal and configured so as to enlarge the operable distance from the wireless transmitter.

In order to achieve the above object, an aspect of the present invention relates to a trigger signal generating device including: a first power source terminal and a second power source terminal; a first current generator, receiving an input signal, to generate a first current with a first amplitude in accordance with the amplitude of the input signal; a second current generator, receiving the first current of the first current generator, to generate a second current with a second amplitude, the second current being flowed from the first power source terminal to the second power source terminal; a current mirror circuit to amplify the second current generated from the second current generator to obtain an amplified current; and a trigger signal generator to convert the amplified current into a trigger signal used for triggering a trigger device, the voltage amplitude of the trigger signal being corresponding to the current amplitude of the amplified current; wherein both of the first and second current generators are connected to either one of the first power source terminal and the second power source terminal.

In the trigger signal generating device, if a signal is input, the first current generator generates a current with a predetermined amplitude in accordance with the amplitude of the signal. The current is supplied to the second current generator so as to generate another current with another amplitude in accordance with the amplitude of the current. An other current is amplified at the current mirror circuit. Thereafter, the thus obtained amplified current is converted into the corresponding voltage (trigger signal). Therefore, even though the amplitude of the current generated at the first current generator is small, the intended trigger signal with a relatively large amplitude can be obtained. As a result, the state of the appliance can be shifted by the trigger signal so that the distance between a wireless transmitter and the appliance can be elongated.

If the signal is not input, the difference in electric potential between the power source terminal with which the second current generator is connected and the input terminal of the signal amplifier is set equal to the difference in electric potential of the power source terminal with which the first current generator is connected and the output terminal of the first current generator. Therefore, since no current is flowed in the first current generator and the second current generator even though the first current generator and the second current generator are switched off so that the electric consumption of the generators, that is, the trigger signal generating device can be reduced.

According to the aspect can be provide a generating device of trigger signal which is designed so as to shift the state of an appliance through the reception of a radio signal and configured so as to enlarge the operable distance from the wireless transmitter.

DETAILED DESCRIPTION OF THE INVENTION

Figure 1:
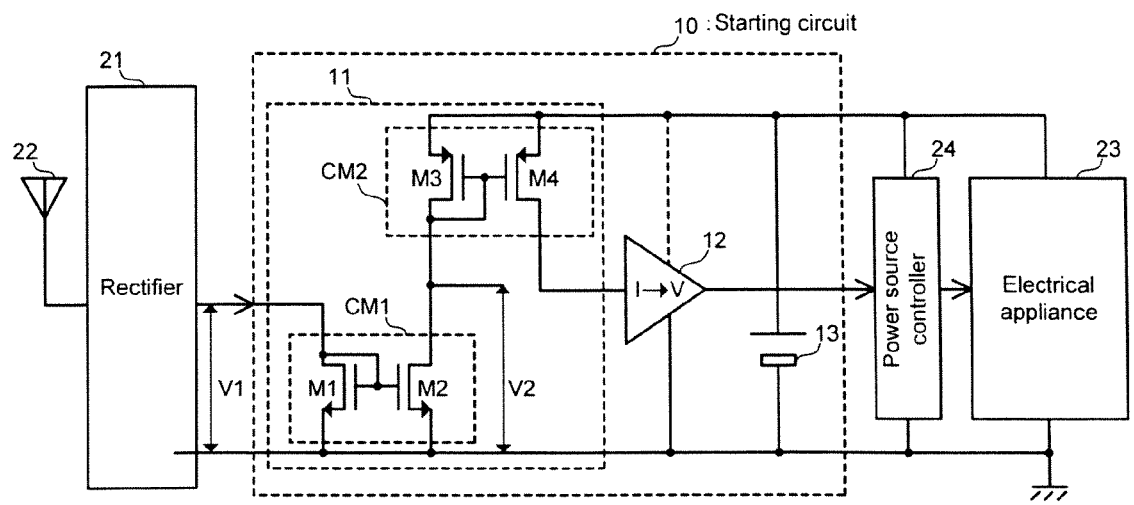
FIG. 1 is a circuit diagram relating to the structure of the trigger signal generating device according to an embodiment.

In an embodiment, the second current generator includes an additional current mirror circuit. In this embodiment, since the current mirror circuit is employed, a current amplifying function can be applied to the second current generator by changing the size(s) of the transistor(s) of the current mirror circuit. Since no current is flowed in the second current generator under the condition of off-state, the electric power consumption in the second current generator can be reduced.

In another embodiment, a plurality of additional current mirror circuits, connected in cascade, may be provided. In this case, the gain of the current amplification can be easily increased and the current direction can be freely controlled (namely, the current can be flowed in forward direction or opposite direction).

In still another embodiment, the first current generator includes a rectifier with an nMOS transistor which is configured such that a rectified voltage is applied to a drain and gate of the nMOS transistor and a standard voltage is applied to a gate of the nMOS transistor. In this case, the intended current with a predetermined amplitude can be easily generated by controlling the amplitude of the signal to be input therein.

In a further embodiment, the second current generator includes a first nMOS transistor and a second nMOS transistor which compose the current mirror circuit, and the current mirror circuit also includes: a first pMOS transistor which is configured such that a drain and gate of the first pMOS transistor are connected with a drain of the second nMOS transistor and a second standard electric potential is applied to a source of the first PMOS transistor; and a second pMOS transistor which is configured such that an amplified current through the signal amplifier is output from a drain of the second pMOS transistor.

In this embodiment, the second current generator generates the current from the first power source terminal to the second power source terminal as describe above and the current is amplified by the current mirror circuit so that the current amplification function can be applied to the second current generator.

In a still further embodiment, the second current generator includes a transistor, and the trigger signal generating device includes an offset compensator for compensating an offset current flowing in a drain of the transistor.

In this embodiment, the offset current (leak current) generated at the transistor of the second current generator can be compensated by the offset compensator when no rectified current is generated so as not to be supplied to the transistor. Therefore, the operations of the components after the second current generator are not affected.

In another embodiment, the trigger signal generator includes: a first nMOS transistor which is configured such that an amplified current through the signal amplifier is flowed from a drain/gate common connection of the first nMOS transistor to a source of the first nMOS transistor; a second nMOS transistor composing an additional current mirror circuit with the first nMOS transistor; a pMOS transistor which is configured such that a drain of the pMOS transistor is connected with a drain of the second nMOS transistor and a standard electric potential is applied to a source of the pMOS transistor; and a biasing voltage generator which is configured such that a voltage generated between a drain/gate common connection of the first nMOS transistor and the source of the first nMOS transistor is input so as to output a nonlinear voltage as a trigger signal in response to an amplitude of the voltage to a gate of the pMOS transistor, wherein the trigger signal is output from a connection node between the drain of the second nMOS transistor and the drain of the PMOS transistor.

In this embodiment, since the biasing voltage to be supplied to the gate of the PMOS transistor is generated by the biasing voltage generator as defined above, the resistance of the PMOS transistor as a load for the first nMOS transistor can be increased as occasion demands. Therefore, the output variable margin of the trigger signal generator can be enlarged. Herein, the trigger signal generator is an input-output inverted current-voltage converter because the voltage to be output is decreased as the amplified current is input.

In still another embodiment, the trigger signal generating device includes: a power source switch which is operated in response to the trigger signal so as to generate and maintain an on-state; a synchronizing circuit for generating a clock signal in synchronization with a variable frequency in output level of the trigger signal generator by the power supply control with the power source switch; a shift resistor for storing a variable hysteresis of the trigger signal generator through the input of the clock signal as a shift signal by the power supply control with the power source switch; a memory for storing a standard information by the power supply control with the power source switch; and a judging circuit for generating an indication signal to indicate that the variable hysteresis in output level is matched with the standard information through the comparison of the variable hysteresis with the standard information by the power supply control with the power source switch.

In this embodiment, the trigger signal is output as an output from the judging circuit and the ID information of the (RF) signal can be determined by the shift resistor and the like. Namely, the trigger signal is judged at the judging circuit whether the trigger signal is exclusively for the intended appliance and thus, can be output for the intended appliance if the trigger signal is exclusively for the intended appliance. In addition, since the synchronizing circuit, the shift resistor and the like is controlled in electric power supply by the power source switch, the electric power saving at off-state can be enhanced.

In a further embodiment, the memory stores a first standard information and a second standard information as the standard information, and the trigger signal generating device includes an additional power source switch which is operated in response to a first indication signal indicating that the variable hysteresis in output level is matched with the first standard information in the judging circuit so as to generate and maintain an off-state and in response to a second indication signal indicating that the variable hysteresis in output level is matched with the second standard information in the judging circuit so as to generate and maintain an on-state.

In this case, the trigger signal generating device can be used as the appliance is switched off by the transmission of the operation signal corresponding to the first standard information in a specific area from the wireless transmitter or the appliance is switched on by the transmission of the operation signal corresponding to the second standard information in a non-specific area. For example, when a cellular phone is employed as the appliance, the cellular phone is switched off compulsively (automatically).

Then, the embodiments will be described with reference to drawings. FIG. 1 shows a trigger signal generating device according to one embodiment. In FIG. 1, an antenna 22, a rectifier 21 and a starting circuit 10 constitute the trigger signal generating device, and an electric power controller 24 and an electrical appliance 23 constitute an object to be controlled in state shift by a trigger signal output by the trigger signal generating device. In this embodiment, the trigger signal is generated so as to switch on the power source of the electric appliance 23 via the electric power controller 24. As the electric appliance 23, a television set, a cellular phone and a wireless communication device for network can be exemplified. The trigger signal may be employed for another use except the switch-on operation as described above.

The antenna 22 receives an electromagnetic wave emitted from a wireless communication device (not shown) which belongs to the operational side and then, outputs an RF signal. The rectifier 21 rectifies the RF signal from the antenna 22, and then, generates a rectified voltage (DC voltage). In this point of view, the rectifier 21 constitutes a voltage generator. Namely, the antenna 22 and the rectifier 21 constitute a power source to generate an electric power through the reception of the external energy. As shown in FIG. 1, the rectifier 21 does not require the power source (as will described below, concretely). However, in order to define the standard voltage of the rectifier 21, the ground of the rectifier 21 is connected with the starting circuit 10. When the RF signal is not input into the rectifier 21 from the antenna 22, the electric potential of the output terminal of the rectifier 21 is set equal to the electric potential of the power source terminal of the rectifier 21. In this case, since the power source terminal is electrically grounded, the output terminal is also electrically grounded.

The starting circuit 10 outputs a trigger signal through the reception of the rectified voltage from the rectifier 21. The trigger signal is supplied to the power source controller 24 so as to switch on the power source 23 on the basis of the supplied trigger signal.

The starting circuit 10 includes an electric current generator/electric current amplifier 11, an electric current-voltage converter 12 and a battery power source 13. The electric current generator is composed of an nMOS transistor M1 so that the rectified voltage output from the rectifier 21 is applied between the drain/gate common connection and the source of the transistor M1 on the basis of the ground voltage (standard voltage or second standard voltage), thereby generating an electric current at the electric current generator. The electric current amplifier is composed of an nMOS transistor M2, and pMOS transistors M3, M4 so that the first current amplification can be carried out at the transistor M1 and the transistor M2 composing the first current mirror circuit CM1 and the second current amplification can be carried out at the second current mirror circuit CM1 composed of the transistors M3 and M4.

The amplified current at the electric current generator/electric current amplifier 11 is output from the drain of the transistor M4 and input into the electric current-voltage converter 12 so as to generate an electric voltage as a trigger signal on the basis of the amplitude of the current input into the converter 12. The polarity of the output voltage may become positive or negative in dependence on the structure of the trigger signal generating device after the power source controller 24. Herein, the connection from the electric current-voltage converter 12 to the ground is designated by the solid line. Then, the connection from the electric current-voltage converter 12 to the power source (second standard voltage or standard voltage) is designated by the broken line because the connection may be often omitted. The battery power source 13 functions as a power source of the starting circuit 10 while the battery power source 13 functions as power sources of the power source controller 24 and the electrical appliance 23.

The starting circuit 10 consumes no electric power from the battery power source 13 under the condition that the rectified current is not input from the rectifier 21, which is originated from that no electric current is flowed in the transistor M1 under the condition of no rectified voltage so that no electric current is flowed in the current mirror circuits CM1 and CM2, and in the electric current-voltage converter 12 because the current state of the converter 12 is stationed if the electric current-voltage converter 12 is composed of a CMOS circuit and the like. The power source controller 24 consumes no electric power from the battery power source 13 on the same reason as the starting circuit 10. Namely, the power source controller 24 may be composed of a CMOS circuit and the like. The electric appliance 23 consumes some electric power from the battery source 13 when the electric appliance 23 is switched on by the trigger signal from the starting circuit 10 via the power source controller 24. The electric appliance 23 consumes no electric current when the electric appliance 23 is switched off.

In this embodiment, since the potential difference V1 between the rectifier 21 and the ground is set equal to the potential difference V2 between the first current mirror circuit CM1 and the ground, no electric current is flowed in the rectifier 21 and the first current mirror circuit CM1 when the rectifier 21 and the first current mirror circuit CM1 are switched off, so that the electric power consumption can be reduced effectively at standby state.

As a result, in FIG. 1, the trigger signal generating device (the antenna 22, the rectifier 21 and the starting circuit 10), the power source controller 24 and the electrical appliance 23 consume no current at standby state, which can exhibit an excellent advantage in view of electric power saving. The electric power consumption at the starting circuit 10 is performed when the antenna 22 receives the electromagnetic wave and the rectifier 21 generates the rectified current. When the electrical appliance 23 is switched on by the trigger signal, some electric power is consumed at the electrical appliance 23. In such a case, however, when the antenna 23 receives no electromagnetic wave, the trigger signal generating device (the antenna 22, the rectifier 21 and the starting circuit 10) and the power source controller 23 consume no electric current.

Not explained, a set/reset flip-flop (SR flip-flop) may be provided at the output of the electric current-voltage converter 12 so as to maintain the on-state of the electrical appliance 23 when the electromagnetic wave disappears so that no trigger signal is generated. Such a state-storing circuit as the SR flip-flop may be provided in the power source controller 23 or the electrical appliance 23. In any case as exemplified above, if the SR flip-flop may be composed of a CMOS circuit, the SR flip-flop consumes no electric power at stationary state.

Figure 2:
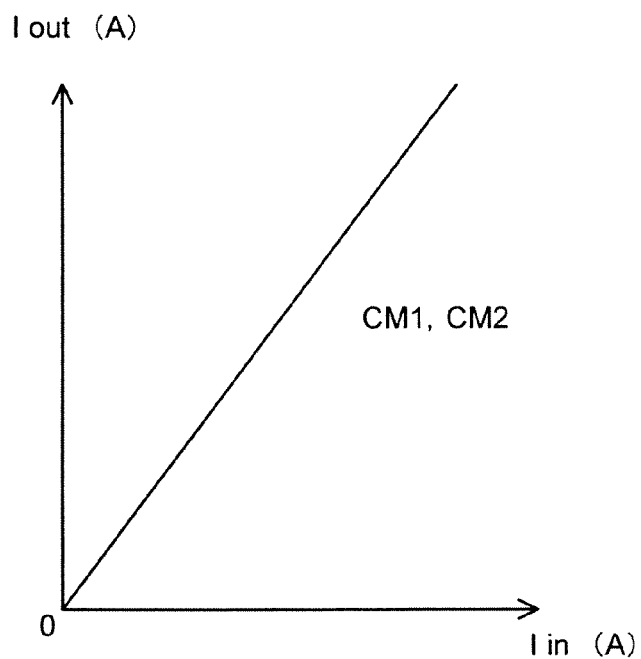
FIG. 2 is a graph showing the input-output current characteristics of the current mirror circuits CM1 and CM2 of the trigger signal generating device shown in FIG. 1.

FIG. 2 shows input/output current characteristics of the current mirror circuits CM1 and CM2 in FIG. 1. As shown in FIG. 2, with each current mirror circuit, the output current Iout is generated in proportion to the input current Iin. In view of an integrated circuit, the proportional constant can be determined by adjusting the size ratio (gate ratio) of each MOS transistor. Namely, the proportional constant is defined as the size ratio of the MOS transistor.

According to the current amplification effect of the current mirror circuits CM1 and CM2, the rectified voltage output from the rectifier 21 is converted into the corresponding current, which is amplified by the current mirror circuits CM1 and CM2. The thus amplified current is converted into the corresponding voltage at the electric current-voltage converter 12. In this way, the initial electric voltage from the rectifier 21 is converted into the corresponding amplified current. Therefore, since the rectified voltage is generated through the reception of the electromagnetic wave, the trigger signal generating device can generates a trigger signal strong enough to switch the state of the electrical appliance even though the intensity of the electromagnetic wave is weak (that is, weak electromagnetic wave). In other words, the distance between the electrical appliance and the wireless communication device (not shown) can be enlarged. If a plurality of current mirror circuits are connected in multistep, the amplification gain can be much enhanced.

According to the first current mirror circuit CM1 which is located near the rectifier 31, when the rectified voltage is beyond a predetermined voltage through the reception of too strong electromagnetic wave, the rectified voltage is reduced below the predetermined voltage. The reduction effect of the rectified voltage is originated from the reduction effect of the input impedance of the current mirror circuit. If the rectified voltage is reduced, the rectification effect of the rectifier 21 can be maintained high so as to reduce the electric power loss.

Figure 3:
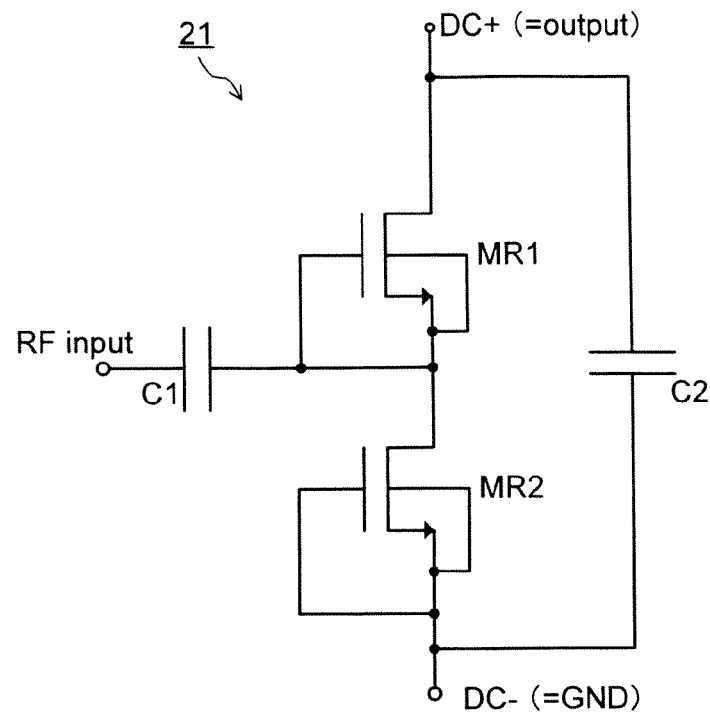
FIG. 3 is a circuit diagram of the rectifier of the trigger signal generating device shown in FIG. 1.

FIG. 3 shows the structure of the rectifier 21 of the trigger signal generating device as shown in FIG. 1. The rectifier 21 is configured such that the nMOS transistor MR1 is connected in series with then MOS transistor MR2 and the gate of each transistor is short-circuited with the source of each transistor (namely, the transistors MR1 and MR2 constitute a sort of diode connection, respectively). Then, the intended RF signal is input in the rectifier 21 via the condenser C1. In this case, the RF signal is applied to the node located between the transistors MR1 and MR2. Then, the smoothing condenser C2 is provided is parallel with the transistors MR1 and MR2 so as to generate an output voltage (rectified voltage) between the drain of the transistor MR1 and the source of the transistor MR2.

In the rectifier 21 shown in FIG. 3, the electric current from the RF signal input therein is flowed subsequently in the transistor MR1, the condenser C2 and the transistor MR2 so as to generate a DC voltage (rectified voltage) at both sides of the condenser C2. In this case, the bottom terminal "DC−" is connected with the ground and the top terminal "DC+" is connected as the output terminal of the rectifier 21 with the starting circuit 10.

In the trigger signal generating device shown in FIG. 1, the first current mirror circuit CM1 is composed of the nMOS transistors and is operated through the reception of the electric current. With the rectifier 21 to be connected with the first current mirror circuit CM1, therefore, the top terminal of the rectifier 21 functions as the output terminal of the rectified voltage as shown in FIG. 3.

Contrary to the starting circuit 10 shown in FIG. 1, the first current mirror circuit CM1 may be composed of a pMOS transistor. In this case, with the rectifier 21 to be connected with the first current mirror circuit CM1, the bottom terminal (negative terminal) "DC−" functions as the output terminal of the rectifier voltage. The positive terminal "DC+" is connected with the VDD of the first current mirror circuit. In this case, the rectified voltage is applied to the first current mirror circuit CM1 in the direction opposite to the direction of current flow from the current mirror circuit CM1. In this way, the current mirror circuit composed of the pMOS transistors can be operated. The rectifier 21 and the starting circuit 10 consume no electric power at standby state.

Figure 4:
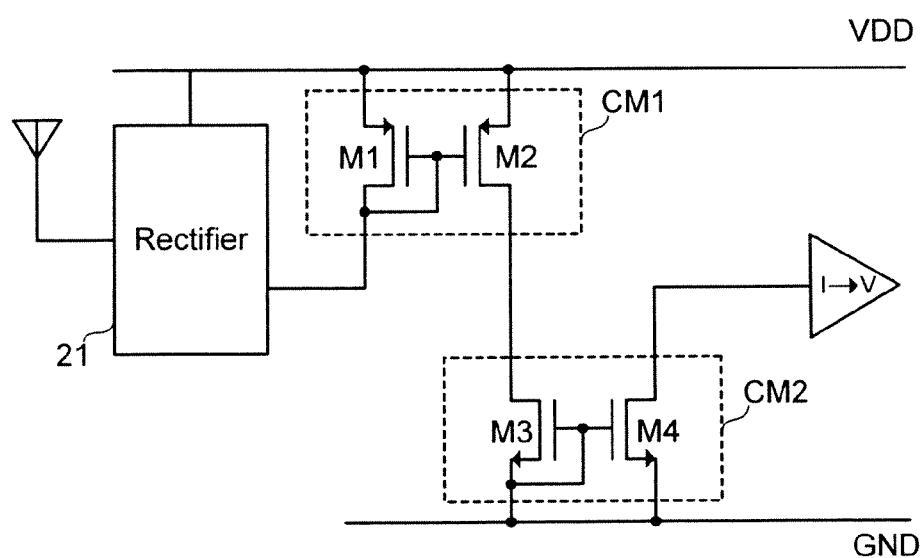
FIG. 4 is a circuit diagram relating to the structure of the trigger signal generating device according to another embodiment.

In the above case where the first current mirror circuit is composed of the pMOS transistor, the rectifier 21 and the structure around the current amplifier 11 can be configured as in FIG. 4.

Figure 5:
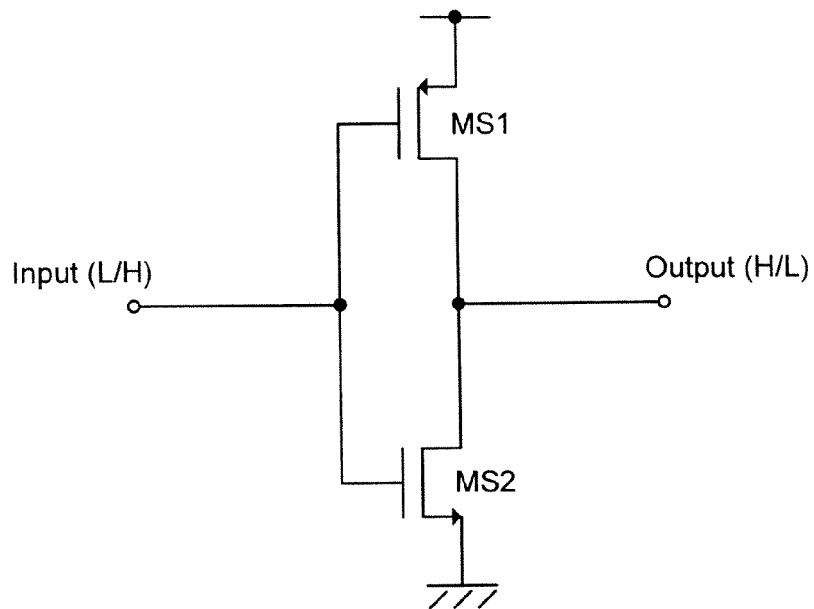
FIG. 5 is a circuit diagram of the power source controller shown in FIG. 1.

FIG. 5 shows the structure of the power source controller 24 shown in FIG. 1. In this embodiment, the power source controller 24 is configured as an inverter (that is, CMOS inverter) composed of the pMOS transistor MS1 and the nMOS transistor MS2. Since the power source controller 24 is configured as a CMOS circuit, the power source controller 24 consumes no electric power at standby state. The electrical appliance 23 to be connected with the power source controller 24 is configured so as to be switched on and off dependent on the voltage level of the output of the power source controller 24.

Figure 6:
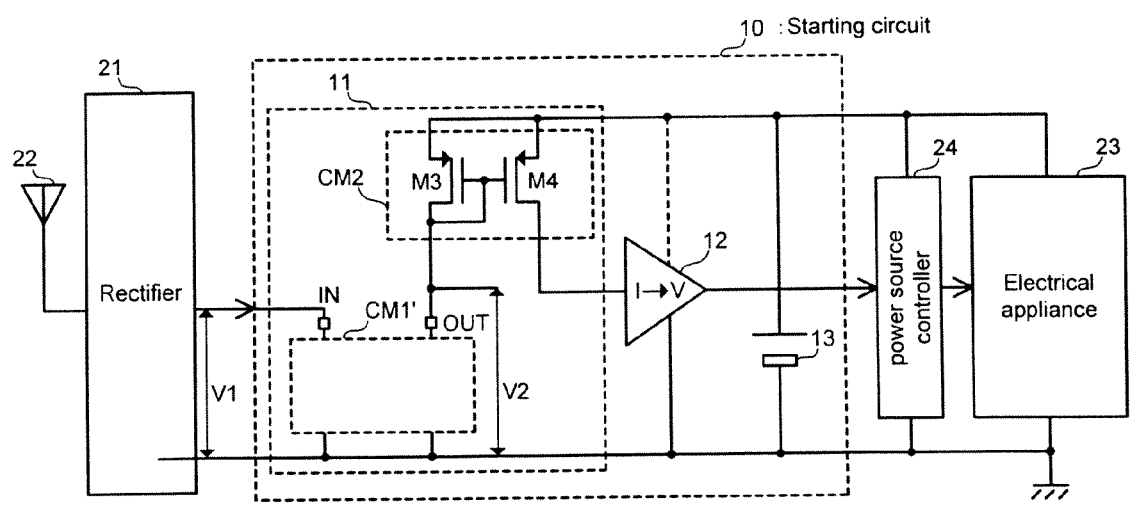
FIG. 6 is a circuit diagram relating to the structure of the trigger signal generating device according to still another embodiment.
Figure 7:
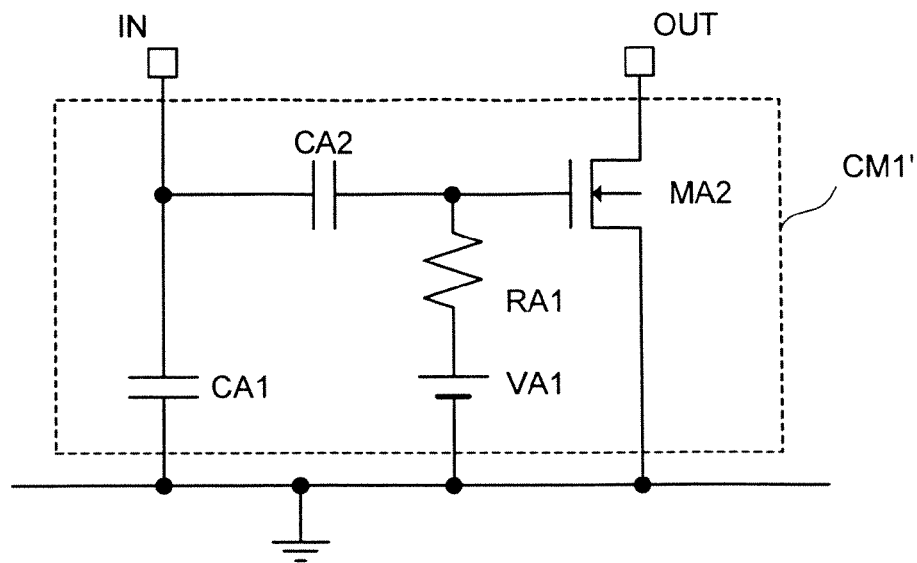
FIG. 7 is a circuit diagram of the current generating circuit shown in FIG. 1.

FIG. 6 relates to a trigger signal generating device modified from the one in FIG. 6. In this embodiment, the current generating circuit CM1' as shown in FIG. 7 is employed instead of the current mirror circuit CM1 as shown in FIG. 1. Like or corresponding components are designated by the same references.

In FIG. 6, the rectifier 21 and the starting circuit 10 constitute the trigger signal generating device, and the electric power controller 24 and the electrical appliance 23 constitute an object to be controlled in state shift by a trigger signal output by the trigger signal generating device. In this embodiment, the trigger signal is generated so as to switch on the power source of the electric appliance 23 via the electric power controller 24. As the electric appliance 23, a television set, a cellular phone and a wireless communication device for network can be exemplified. The trigger signal may be employed for another use except the switch-on operation as described above.

The rectifier 21 rectifies the RF signal from the antenna 22, and then, generates an rectified voltage (DC voltage). In this point of view, the rectifier 21 constitutes a voltage generator. The trigger signal is supplied to the power source controller 24. The power source controller 24 switches on the electrical appliance 23 on the supplied trigger signal.

The starting circuit 10 includes the electric current generator/electric current amplifier 11, the electric current-voltage converter 12 and the battery power source 13. In the electric current generator/electric current amplifier 11, the current generating circuit CM1' may be configured as shown in FIG. 7, for example. The electric current generator is composed of an nMOS transistor MA2 so that the rectified voltage output from the rectifier 21 is applied to the upper side of the capacitor CA1 under the condition that the lower side of the capacitor CA1 is electrically grounded (Namely, the electric potential of the lower side of the capacitor CA1 is defined as a standard electric potential or second standard electric potential). In this case, a current is flowed in the electric current generator. The capacitor CA2 is provided between the capacitor CA1 and the gate of the nMOS transistor MA2 so that a predetermined voltage is applied to the gate of the nMOS transistor MA2 in accordance with the voltage to be applied to the capacitor CA1.

Then, the power source VA1 is connected with the gate of the nMOS transistor MA2 via the resistance RA1 so that a predetermined voltage is applied between the gate and the source of the nMOS transistor MA2. The electric current amplifier is composed of an nMOS transistor MA2, and pMOS transistors M3, M4 so that the first current amplification can be carried out at the transistor MA2 and the second current amplification can be carried out at the second current mirror circuit CM2 composed of the transistors M3 and M4.

The amplified current at the electric current generator/electric current amplifier 11 is output from the drain of the transistor M4 and input into the electric current-voltage converter 12 so as to generate an electric voltage on the basis of the amplitude of the current input into the converter 12. The polarity of the output voltage may become positive or negative in dependence on the structure of the trigger signal generating device after the power source controller 24. Herein, the connection from the electric current-voltage converter 12 to the ground is designated by the solid line. Then, the connection from the electric current-voltage converter 12 to the power source (second standard voltage or standard voltage) is designated by the broken line because the connection may be often omitted. The battery power source 13 functions as a power source of the starting circuit 10 while the battery power source 13 functions as power sources of the power source controller 24 and the electrical appliance 23.

The starting circuit 10 consumes no electric power from the battery power source 13 under the condition that the rectified current is not input from the rectifier 21, which is originated from that no electric current is flowed in the nMOS transistor MA2 with no rectified voltage so that no electric current is flowed in the current mirror circuit CM2, and in the electric current-voltage converter 12 because the current state of the converter 12 is stationed if the electric current-voltage converter 12 is composed of a CMOS circuit and the like. The power source controller 24 consumes no electric power from the battery power source 13 on the same reason as the starting circuit 10 because the power source controller 24 may be composed of a CMOS circuit and the like. The electric appliance 23 consumes some electric power from the battery source 13 when the electric appliance 23 is switched on by the trigger signal from the starting circuit 10 via the power source controller 24. The electric appliance 23 consumes no electric current when the electric appliance 23 is switched off.

In this embodiment, since the potential difference V1 between the rectifier 21 and the ground is set equal to the potential difference V2 between the output terminal of the current generating circuit CM1' and the ground, no current is flowed in the rectifier 21 and the current generating circuit when the rectifier 21 and the current generating circuit CM1' are switched off, so that the electric power consumption can be reduced effectively at standby state.

Then, the current generating circuit CM1' in FIG. 7 will be described. A predetermined voltage can be applied between the gate and source of the nMOS transistor MA2 from the power source VA1. For example, when the voltage equal to the threshold voltage of the transistor MA2 is applied, the transistor MA2 does not conduct the amplification with no input signal, but the transistor MA2 conduct the amplification to some degrees with input signal because the voltage applied to the transistor MA2 is beyond the threshold value of the transistor MA2. Therefore, even though Therefore, even though the intensity of the input signal is low, the input signal is amplified by the transistor MA2.

Figure 8:
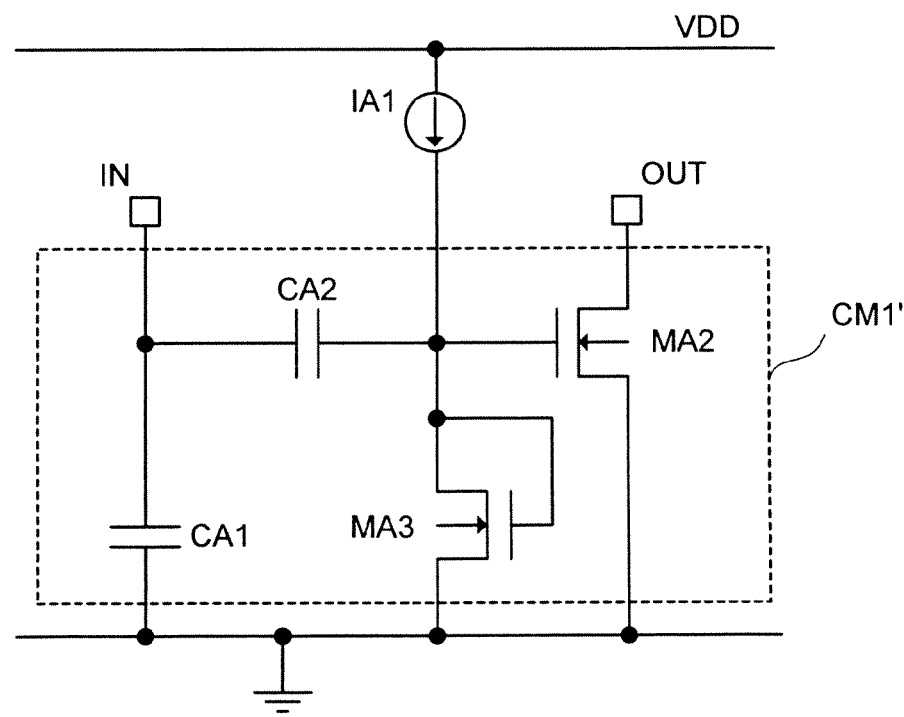
FIG. 8 is another circuit diagram of the current generating circuit shown in FIG. 1.

The current generating circuit CM1' may be configured as shown in FIG. 8. In order to apply a predetermined voltage between the gate and source of the nMOS transistor MA2, in this case, the nMOS transistor MA3 with diode connection is provided between the current power source iA1 connected with the VDD and the gate of the transistor MA2 and the ground.

In this case, a predetermined current is supplied to the nMOS transistor MA3 from the current power source IA1 to generate a given voltage at the transistor MA3 in dependence with the value of the current supplied thereto. The voltage generated at the transistor MA3 is supplied between the gate and source of the transistor MA2. When the voltage generated at the transistor MA3 is applied to the transistor MA2 under the condition that the generated voltage is set equal to the threshold voltage of the transistor MA2, the transistor MA2 does not conduct the amplification with no input signal, but the transistor MA2 conduct the amplification to some degrees with input signal because the voltage applied to the transistor MA2 is beyond the threshold value of the transistor MA2. Therefore, even though the intensity of the input signal is low, the input signal is amplified by the transistor MA2.

Figure 9:
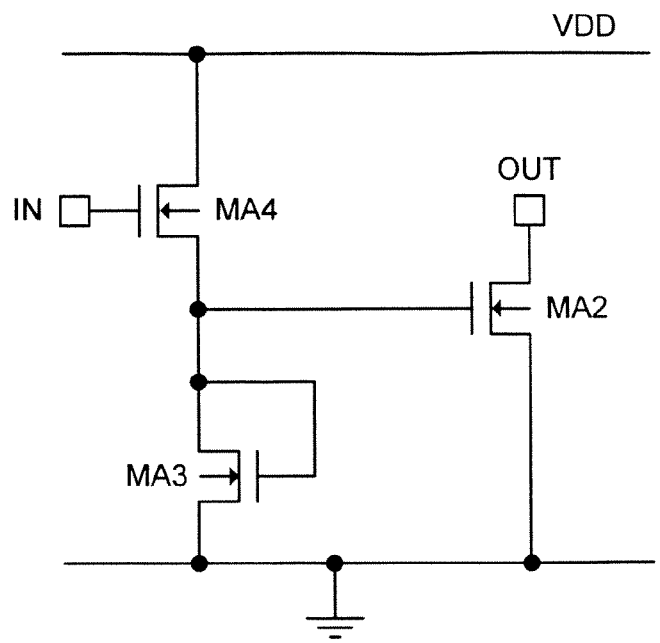
FIG. 9 is still another circuit diagram of the current generating circuit shown in FIG. 1.

The current generating circuit CM1' may be configured as shown in FIG. 9. In order to apply a predetermined voltage between the gate and source of the nMOS transistor MA2, in this case, the MOS transistors MA3 and MA4 are connected in series between the VDD and the ground so that the gate of the nMOS transistor MA2 is connected with the node between the transistors MA3 and MA4. In this embodiment, when an input signal is supplied to the transistor MA4, the transistor MA4 is switched on, thereby supplying a current to the transistor MA3 so that a predetermined voltage is applied between the gate and source of the transistor MA2 from the transistor MA3.

When the voltage generated at the transistor MA3 is applied to the transistor MA2 under the condition that the generated voltage is set equal to the threshold voltage of the transistor MA2, the transistor MA2 does not conduct the amplification with no input signal, but the transistor MA2 conduct the amplification to some degrees with input signal because the voltage applied to the transistor MA2 is beyond the threshold value of the transistor MA2. Therefore, even though the intensity of the input signal is low, the input signal is amplified by the transistor MA2.

Figure 10:
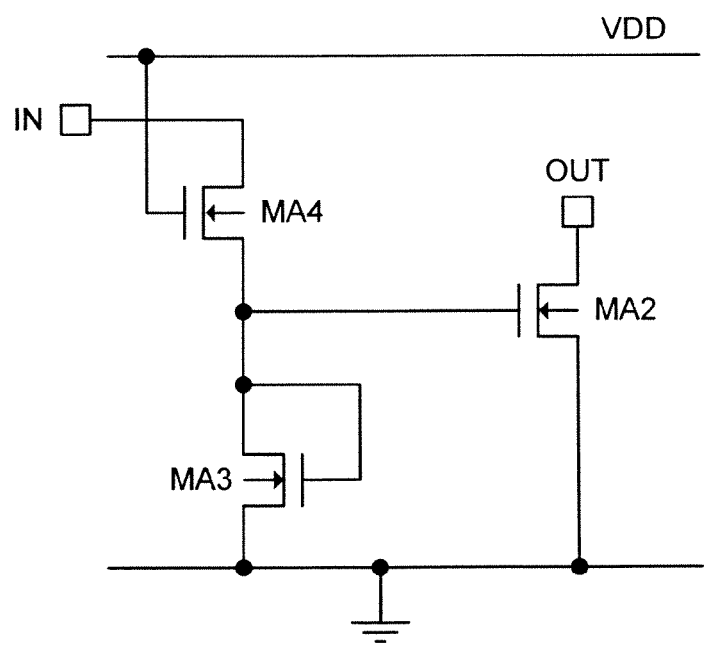
FIG. 10 is a further circuit diagram of the current generating circuit shown in FIG. 1.

The current generating circuit CM1' may be configured as shown in FIG. 10. In order to apply a predetermined voltage between the gate and source of the nMOS transistor MA2, in this case, the MOS transistors MA3 and MA4 are connected in series so that an input signal is supplied to the source of the MOS transistor MA4 and a predetermined voltage is supplied to the gate of the MOS transistor MA4 from the VDD. As a result, the input signal is amplified at the transistor MA4 and thus, a given current is supplied to the transistor MA3 so as to generate a given voltage in dependence on the current supplied thereto. The voltage generated at the transistor MA3 is applied between the gate and source of the transistor MA2.

When the voltage generated at the transistor MA3 is applied to the transistor MA2 under the condition that the generated voltage is set equal to the threshold voltage of the transistor MA2, the transistor MA2 does not conduct the amplification with no input signal, but the transistor MA2 conduct the amplification to some degrees with input signal because the voltage applied to the transistor MA2 is beyond the threshold value of the transistor MA2. Therefore, even though the input signal is small, the input signal is amplified by the transistor MA2.

The trigger signal generating device shown in FIG. 6 consumes no electric current at standby, but generates a trigger signal when the signal detector 21 detects a signal, thereby switching on the electrical appliance 23.

Figure 11:
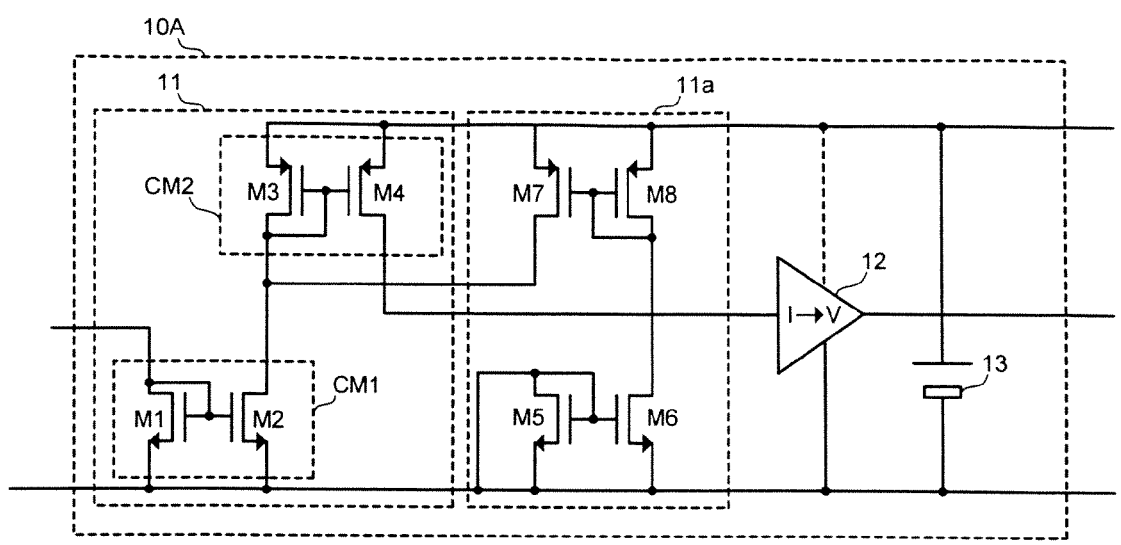
FIG. 11 is a circuit diagram relating to the structure of the trigger signal generating device according to a further embodiment.

FIG. 11 relates to an embodiment modified from the embodiment relating to FIG. 1. In this embodiment, the offset current compensating unit is provided. In FIG. 11, like or corresponding components are designated by the same reference numerals in FIG. 1.

The starting circuit 10A includes the offset current compensating circuit 11a in order to compensate the offset current (leak current) generated by the transistor M2 provided at the output terminal of the first current mirror circuit CM1 when no current is flowed in the transistor M1 of the first current mirror circuit CM1. Although the offset current of the transistor M2 is very small, the offset current often disturbs the normal operation of circuits provided after the current-voltage converter 12 without the offset current compensating circuit 11a because the offset current is amplified.

The offset current compensating circuit 11a includes the transistors M5, M6, M7 and M8. The transistors M5 and M6 constitute a current mirror circuit configured in the same manner as the current mirror circuit CM1. The transistors M7 and M8 constitute a current mirror circuit configured in the same manner as the current mirror circuit CM2. Namely, the drain and the gate of the transistor M5 corresponding to the transistor M1 are connected with the ground. The connection state means that the rectified voltage is not input into the transistor M1. In this case, the electric current corresponding to the offset current generated by the transistor M2 is generated at the transistor M6, and input into the transistor M2 via the transistors M7 and M8 so that the electric current generated at the transistor M3 can be compensated. In this way, the normal operation of the circuits after the second current mirror circuit CM2.

The size (gate width) of the transistor M1 is set equal to the size of the transistor M5. The size (gate width) of the transistor M2 is set equal to the size of the transistor M6. The sizes (gate widths) of the transistors M3, M7 and M8 are set equal to one another. However, each transistor may be set to any size only if the offset current of the transistor M2 can be compensated by the transistor M7. In view of an integrated circuit, it is desired that the same size transistors are provided in the vicinity of one another so as to form the combination of the transistors.

Figure 12:
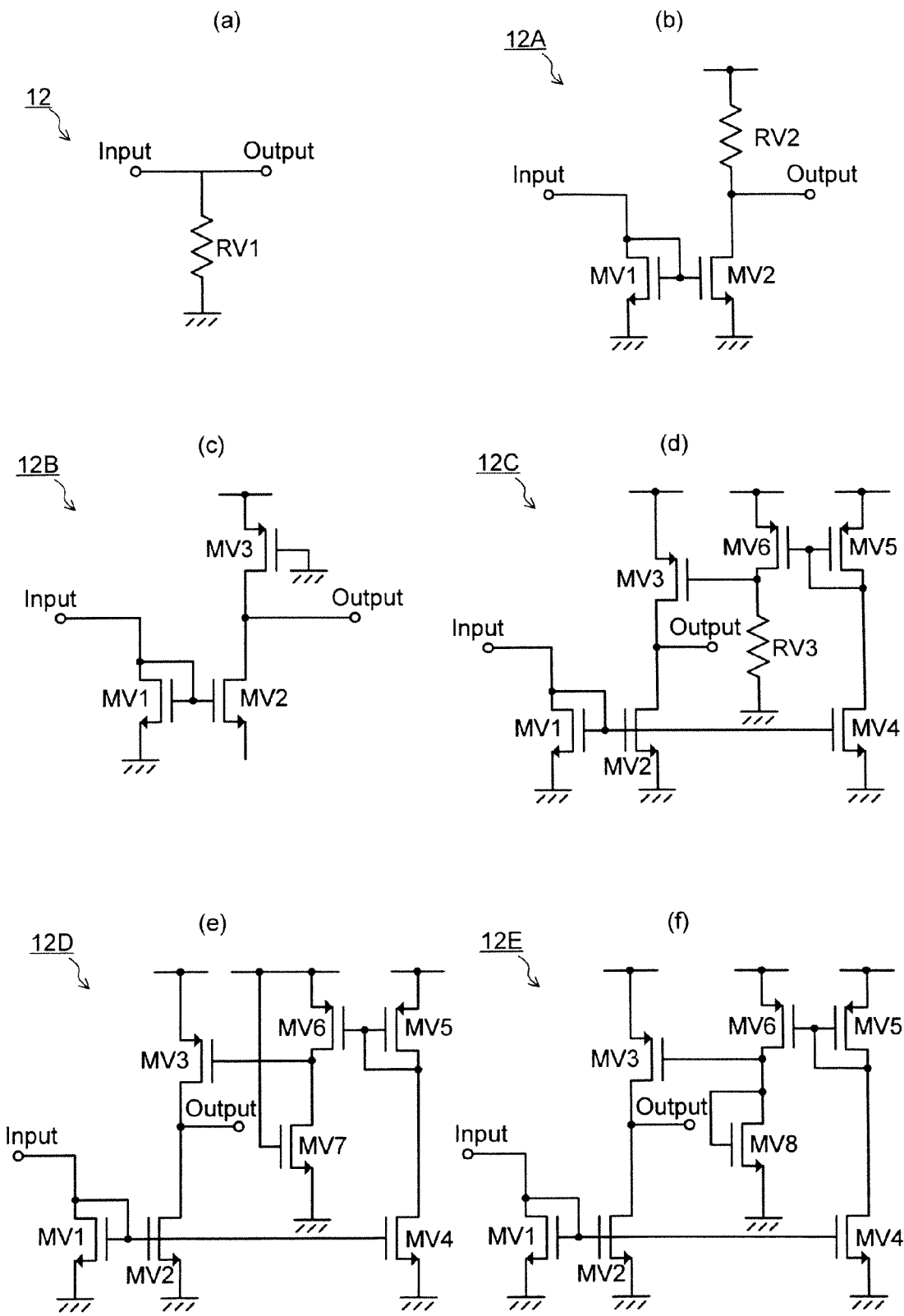
FIG. 12 is a circuit diagram comprising the current-voltage converter shown in FIGS. 1 and 6.

Then, some components of the trigger signal generating device will be described. FIG. 12 shows the concrete structure of the current-voltage converter 12 in the above described embodiment relating to FIG. 1. FIG. 12(a) shows a simplest structure of the current-voltage converter 12 where the resistance RV1 is provided between the input node and the ground. The intended output voltage can be obtained by the difference (the multiplication of the input current by the resistance RV1) between the input voltage and the output voltage on the basis of the ground voltage. The current-voltage converter 12 consumes no electric current under the condition of no input current.

In FIG. 12(b), the current-voltage converter 12A is configured such that the current is input into the nMOS transistor V1 with diode connection so as to generate the output voltage at the drain of the nMOS transistor MV2. The nMOS transistor MV1 and the nMOS transistor MV2 constitute the current mirror circuit. In this case, the resistance RV2 is provided between the drain of the transistor MV2 and the VDD (standard electric potential) so as to generate the output voltage. The polarity of the output voltage in the current-voltage converter 12A in FIG. 12(b) is opposite to the polarity of the output voltage in the current-voltage converter 12A in FIG. 12(a). The current-voltage converter 12A consumes no electric current under the condition of no input current.

In FIG. 12(c), the current-voltage converter 12B includes the pMOS transistor MV3 instead of the resistance RV2. In this case, the pMOS transistor MV3 functions as an active load for the transistor MV2. The gate of the transistor MV3 is fixed in electric potential (in this case, the ground potential). Since the resistance is not required, the layout area of the components such as transistors can be reduced. The current-voltage converter 12B consumes no electric current under the condition of no input current.

In FIG. 12(d), the current-voltage converter 12C is configured such that the gate voltage of the transistor MV3 is increased as the electric current to be input into the current-voltage converter 12C is increased. The current is flowed into the resistance RV3 via the nMOS transistor MV4 and the PMOS transistors MV5 and MV6 so that the gate voltage of the transistor MV3 can be increased. The nMOS transistor MV4 and the transistor MV1 constitute the current mirror circuit. The pMOS transistors MV5 and MV6 constitute the current mirror circuit located at the side of the VDD (second standard voltage). The resistance V3 functions as a load for the transistor MV6.

Figure 14:
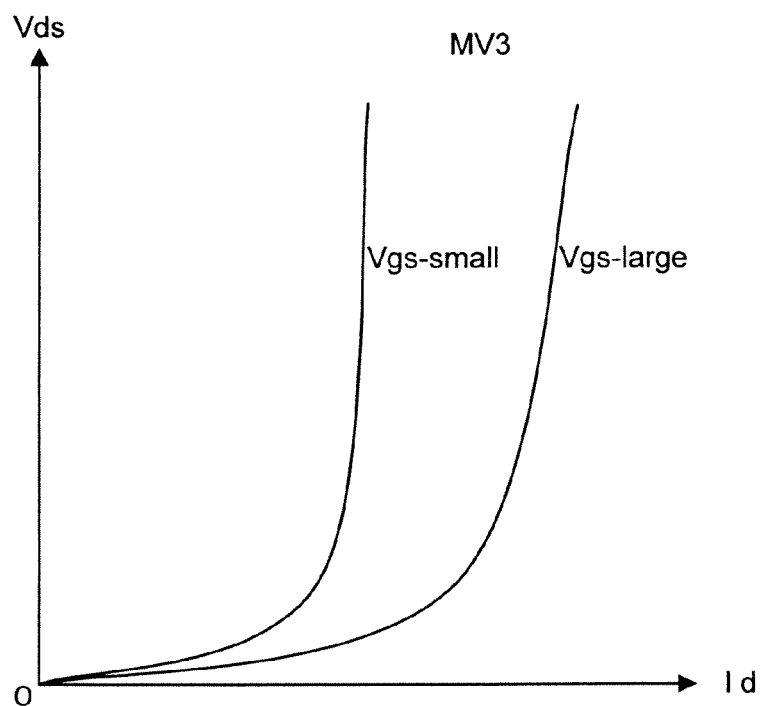
FIG. 14 is a graph showing the current-voltage characteristic of the pMOS transistor of the current-voltage converter in FIG. 13.

FIG. 14 shows the current-voltage characteristic of the pMOS transistor MV3 shown in FIG. 12(d). In FIG. 14, the reference character "Vgs-small" exhibits the current-voltage characteristic of the pMOS transistor MV3 shown in FIG. 12(c) and the reference character "Vgs-large" exhibits the current-voltage characteristic of the pMOS transistor MV3 when the gate voltage of the transistor MV3 is increased. In view of the physical property of a normal transistor, when the gate/source voltage Vgs is decreased, the drain current Id is decreased. Therefore, the direct-current resistance Vds/Id is increased. Namely, the transresistance of the current-voltage converter 12C is increased when the input voltage is converted into the corresponding output voltage. Therefore, the output variation of the current-voltage converter shown in FIG. 12(d) becomes larger than the output variation of the current-voltage converter shown in FIG. 12(c). The current-voltage converter 12C consumes no electric current under the condition of no input current.

In FIG. 12(e), the current-voltage converter 12D includes the nMOS transistor MV7 instead of the resistance RV3. In this case, the nMOS transistor MV7 functions as an active load for the transistor MV6. Since the resistance is not required, the layout area of the components such as transistors can be reduced. The current-voltage converter 12D consumes no electric current under the condition of no input current.

In FIG. 12(f), the current-voltage converter 12E includes the nMOS transistor MV8 with diode connection instead of the resistance RV3. In this case, the nMOS transistor MV8 functions as an active load for the transistor MV8. Since the resistance is not required, the layout area of the components such as transistors can be reduced. The current-voltage converter 12D consumes no electric current under the condition of no input current.

Figure 13:
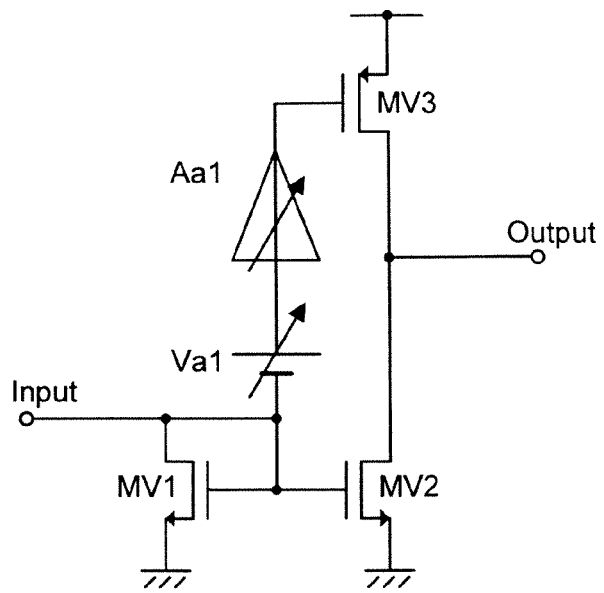
FIG. 13 is a concrete circuit diagram of the current-voltage converter shown in FIGS. 1 and 6.

FIG. 13 shows the concrete structure of the current-voltage converter 12. FIG. 13 relates to the total structure of the current-voltage converter 12 including the structure as shown in FIGS. 12(d), 12(e) and 12(f). Like or corresponding components are designated by the same references.

In the current-voltage converter 12 shown in FIG. 13, the current is flowed into the nMOS transistor MV1 with diode connection so as to generate the output voltage at the drain of the nMOS transistor MV2. The transistors MV1 and MV2 constitute the current mirror circuit. The pMOS transistor MV3 of which the source is connected with the VDD is provided between the VDD and the drain of the transistor MV2. The drain of the PMOS transistor MV3 is connected with the drain of the transistor MV2 so that the PMOS transistor MV3 can function as an active load for the transistor MV2.

The variable power source Va1 and the variable amplifier Aa1 are connected in series with the input terminal so that the output of the variable amplifier Aa1 is connected with the gate of the pMOS transistor MV3. The variable power source Va1 varies the output voltage in accordance with the amplitude of the voltage generated at the nMOS transistor MV1. In the case that the output voltage from the variable power source Va1 is increased, the gate voltage of the transistor MV3 is increased so that the operational region of the transistor MV3 is shifted from the linear region to the saturated region. In other words, the variable power source Va1 varies the current-voltage characteristic of the transistor MV3.

When no signal is input for the input terminal, the electric potential of the variable power source Va1 is set to the ground potential. Since the output voltage of the variable power source Va1 is set to about zero volt, the absolute Value of the Vgs of the transistor MV3 becomes large. In this case, the operation region of the transistor MV3 is set to the linear region (corresponding to the linear region of the curve "Vgs-large" in FIG. 14. Therefore, even though some noise signals are output from the transistor MV2, the corresponding noise signals are not generated at the transistor MV3 because the impedance of the transistor MV3 becomes low. The output voltage corresponds to the VDD (high state).

When a signal with an amplitude larger than the minimum input sensitivity of the variable power source Va1 is input for the input terminal, a given voltage is generated at the input terminal so that the variable power source Va1 generates the biasing voltage. In this case, the absolute Value of the Vgs of the transistor MV3 becomes small so that the operational region of the transistor MV3 is set to the saturated region (corresponding to the saturated region of the curve "Vgs-small". Therefore, the impedance of the transistor MV3 becomes large so that the output voltage of the output terminal becomes zero (ground potential). In this case, the output voltage corresponds to the low state.

The variable amplifier Aa1 amplifies the output voltage of the variable power source Va1 so that the variable range of the gate voltage of the transistor MV3 can be enhanced, and thus, the variable load range of the transistor can be enhanced. Namely, the variable power source Va1 and the variable amplifier Aa1, which are connected in series with one another, constitute the biasing voltage generating unit for the transistor MV3 and can be defined as the non-linear component which can vary the output voltage remarkably in accordance with the voltage variation at the input side of the current-voltage converter 12. It is desired that the variable amplifier Aa1 is configured such that the gain of the amplifier Aa1 becomes small when the voltage at the input side is small and the gain of the amplifier Aa1 becomes large when the voltage at the input side is large.

According to the structure of the current-voltage converter 12 shown in FIG. 13, the output voltage can be varied remarkably when the input current is beyond a predetermined threshold value. The current-voltage converter 12F consumes no electric current under the condition of no input current. As described above, the variable amplifier Aa1 and the variable power source Va1 can be configured as in FIGS. 12(d), 12(e) and 12(f).

Figure 15:
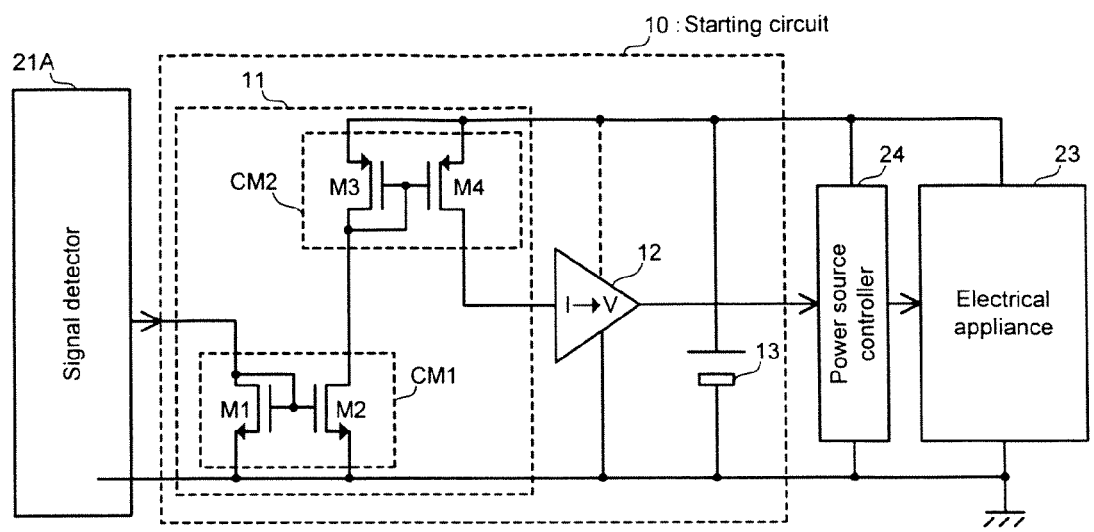
FIG. 15 is a circuit diagram relating to the structure of the trigger signal generating device according to a still further embodiment.

Then, another embodiment will be described with reference to FIG. 15. FIG. 15 shows a trigger signal generating device according to this embodiment. Like or corresponding components are designated by the same reference numerals, and thus, the explanation for the like or corresponding components will be omitted. In this embodiment, the signal detector 21A is employed as the energy generator which generates electric power through the reception of external energy, instead of the rectifier 21.

For example, the signal detector 21A is composed of a rectification circuit using a diode and/or a MOS transistor or a photoelectric conversion element such as a photo voltaic power generating element using a PN semiconductor element. Namely, the signal detector 21A includes at least an element which can generate a DC voltage in response to the input signal (e.g., optical signal) from an operational instrument (not shown).

In the case that the signal detector 21A includes the photoelectric conversion element, if the photoelectric conversion element is formed as a Si-based PN junction element, the side of p-type semiconductor is connected with the ground potential and the side of n-type semiconductor is connected with the starting circuit 10. Therefore, the side of n-type semiconductor is defined as the output of the signal detector 21A. When an optical signal is input into the photoelectric conversion element, some electric charges are moved from the p-type semiconductor to the n-type semiconductor so as to increase the electric potential at the output on the basis of the photo-electric effect. According to the above-described operation, the input optical signal is detected so as to generate an electric voltage in accordance with the intensity of the input optical signal. When no optical signal is input, the electric charges are not moved because the photo-electric effect does not occur. Then, since the p-type semiconductor and the n-type semiconductor are connected with the ground (set to the ground potential), the signal detector 21A consumes no electric power. As a result, the signal detector 21A can be set as the standby state so as to receive the optical signal under the condition of no electric power consumption.

The starting circuit 10 is operated by the electric voltage generated by the signal detector 21A in response to the optical signal input from an operational instrument (not shown), thereby outputting the trigger signal. When a signal train is generated by switching the optical signal, the starting circuit 10 can generate the corresponding signal data.

Figure 16:
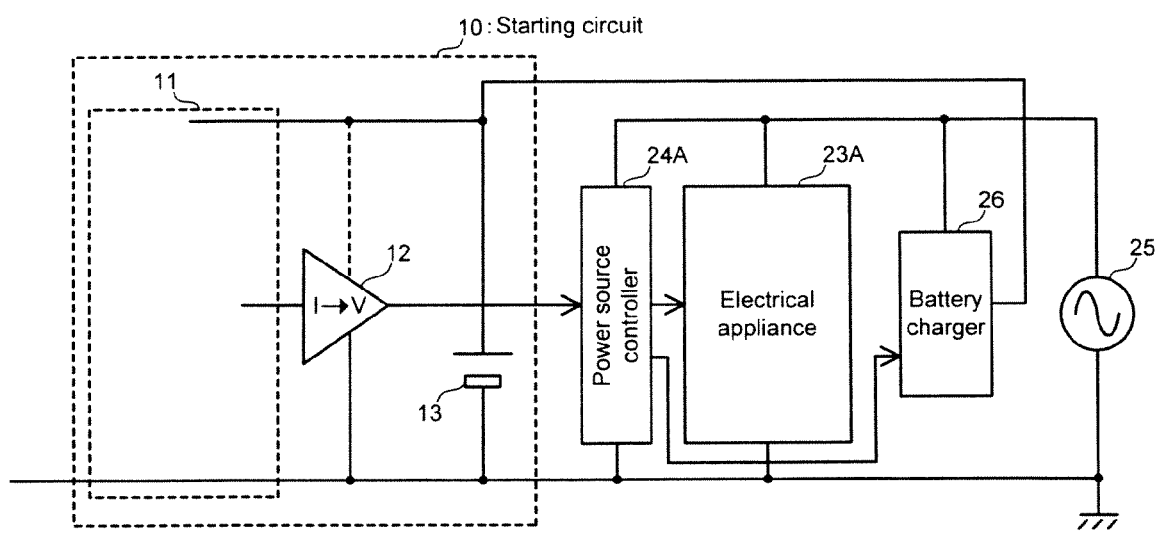
FIG. 16 is a circuit diagram relating to the structure of the trigger signal generating device according to another embodiment.

Then, still another embodiment will be described with reference to FIG. 16. FIG. 16 shows a trigger signal generating device according to this embodiment. Like or corresponding components are designated by the same reference numerals, and thus, the explanation for the like or corresponding components will be omitted. In this embodiment, the battery power source 13 is electrically charged by the trigger signal.

In FIG. 16, the electric power for the electrical appliance 23A and the power source controller 24A is supplied from the AC power source 25, not the battery power source 13. The electric power for the battery charger 26 is supplied from the AC power source 25. When the trigger signal is input into the power source controller 24A from the starting circuit 10, the electrical appliance 23A is switched on by the power source controller 24 and the battery charger 26 is switched on simultaneously. Then, the battery power source 13 is electrically charged by the battery charger 26.

Namely, when the trigger signal is input into the power source controller 24 from the starting circuit 10 so as to switch on the power source controller 24, the electrical appliance 23A is operated by the output from the power source controller 24A. Then, the battery charger 26 is operated by the output from the power source controller 24A so as to generate a prescribed electric voltage to be applied to the positive electrode of the battery power source 13. As a result, the battery power source 13 is charged to the prescribed electric voltage. Normally, the maximum charging voltage of the battery power source 13 is set to the prescribed voltage. The electric power for the electrical appliance 23A, the power source 24A and the battery charger 26 is supplied from the AC power source 25 (or an external DC power source) of which the output range is set larger than the output range of the battery power source 13.

When the trigger signal is not output from the starting circuit 10, that is, the starting circuit 10 is set off, the power source controller 24A is set off so that the electric appliance 23A and the battery charger 26 are set off. As a result, the electric power from the AC power source is not consumed.

In this embodiment, the battery power source 13 is electrically charged by the battery charger 26 when the electrical appliance 23A is set on. As a result, the battery power source 13 is automatically charged when the electrical appliance 23A is switched on, so that the exchange of the battery power source 13 due to battery exhaustion is not almost required.

Figure 17:
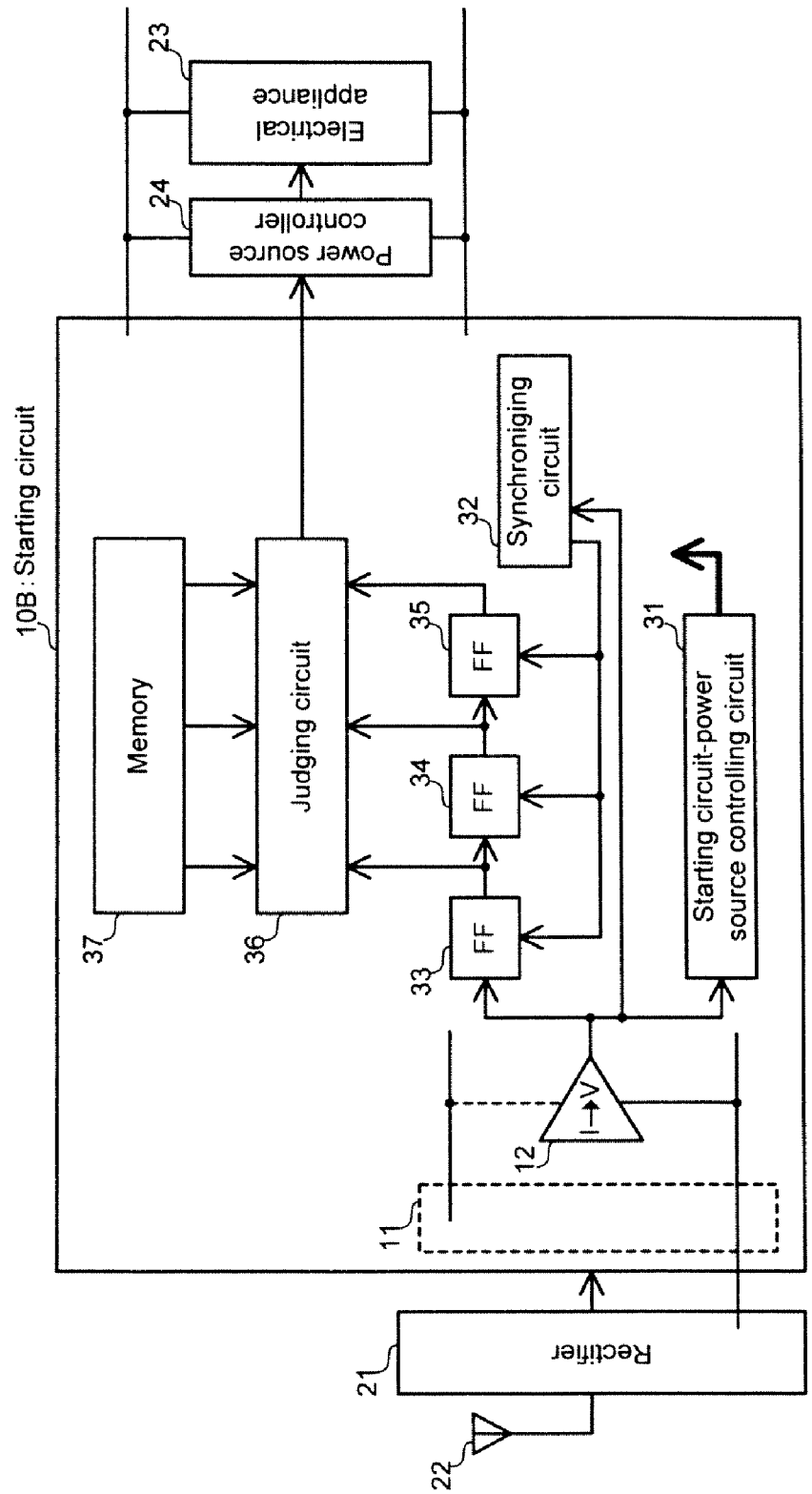
FIG. 17 is a circuit diagram relating to the structure of the trigger signal generating device according to still another embodiment.

Then, a further embodiment will be described with reference to FIG. 17. FIG. 17 shows a trigger signal generating device according to this embodiment. Like or corresponding components are designated by the same reference numerals, and thus, the explanation for the like or corresponding components will be omitted. In this embodiment, the trigger signal generating device is configured such that an intended operation can be performed even though a plurality of electric appliances are provided in the elongated operational distance of the generating device.

In the trigger signal generating device according to this embodiment, the starting circuit 10B includes the starting circuit-power source controlling circuit 31, the synchronizing circuit 32, the flip-flops 33, 34, 35, the judging circuit 36 and the memory 27.

The starting circuit-power source controlling circuit 31 is an electric power switch for controlling in on-off the power source of the starting circuit 10B. In this case, the starting circuit-power source controlling circuit 31 is switched on by the trigger signal from the current-voltage converter 12 so as to switch on the power source of the starting circuit 10B. Once the trigger signal is received, the state of switch on of the power source of the starting circuit 10B can be maintained. When the starting circuit 10B is switched on, the synchronizing circuit 32, the flip-flops 33, 34, 35, the judging circuit 36 and the memory 37 are operated. The electric consumption of the electric current generator/electric current amplifier 11 and the current-voltage converter 12 is already described above.

The synchronizing circuit 32 generates a clock signal with a given frequency and timing in response to the variation frequency of the output level of the current-voltage converter 12. The clock signal may contain a PLL, for example. When the synchronizing circuit 32 is operated by the starting circuit-power source controlling circuit 31, the output of the current-voltage converter 12 is varied at a given frequency in accordance with the preamble of a radio operating signal. Therefore, the synchronizing circuit 32 generates the clock signal in response to the frequency of the output of the current-voltage converter 12. The clock signal is supplied at least to the flip-flops 33, 34, 35.

The flip-flops 33, 34, 35 constitute the shift resistor. The shift operation of the shift resistor depends on the clock signal from the synchronizing circuit 32. For example, when the flip-flops 33, 34, 35 are operated by the starting circuit-power source controlling circuit 31, the output level (high state or low state) of the current-voltage converter 12 is varied in accordance with the ID information of the electrical appliance to be operated according to the ID information continued from the preamble of the radio operating signal. The thus obtained variation record is stored in the flip-flops 33, 34, 35 constituting the shift resistor, and transmitted to the judging circuit 36.

The memory 37 stores in nonvolatility the ID information (standard information) of the electrical appliance 23 to be operated. For example, when the memory 37 is operated by the starting circuit-power source controlling circuit 31, the ID information stored in the memory 37 is read out and transmitted to the judging circuit 36.

The judging circuit 36 compares the ID information in the flip-flops 33, 34, 35 with the ID information in the memory 37. When the ID information in the flip-flops 33, 34, 35 is matched with the ID information in the memory 37, the judging circuit 36 outputs the result about the matching of ID information, which is supplied to the power source controller 24. In order to maintain the judgment result by the judging circuit 36, set/reset flip-flops (SR flip-flops) may be provided at the output of the judging circuit 36. The SR flip-flops may be provided in the power source controller 24 or the electrical appliance 23.

As described above, in this embodiment, the starting circuit-power source controlling circuit 31, the synchronizing circuit 32, the flip-flops 33, 34, 35 (shift resistor), the judging circuit 36 and the memory 37 are provided between the current-voltage converter 12 and the power source controller 24 as shown in FIG. 1 so as to confirm at least the ID information of the electrical appliance 23. The number of flip-flop is not restricted to three as described in this embodiment, but may be set to any number in accordance with the amount of the ID information. For example, the number of flip-flop is set to four or more.

Figure 18:
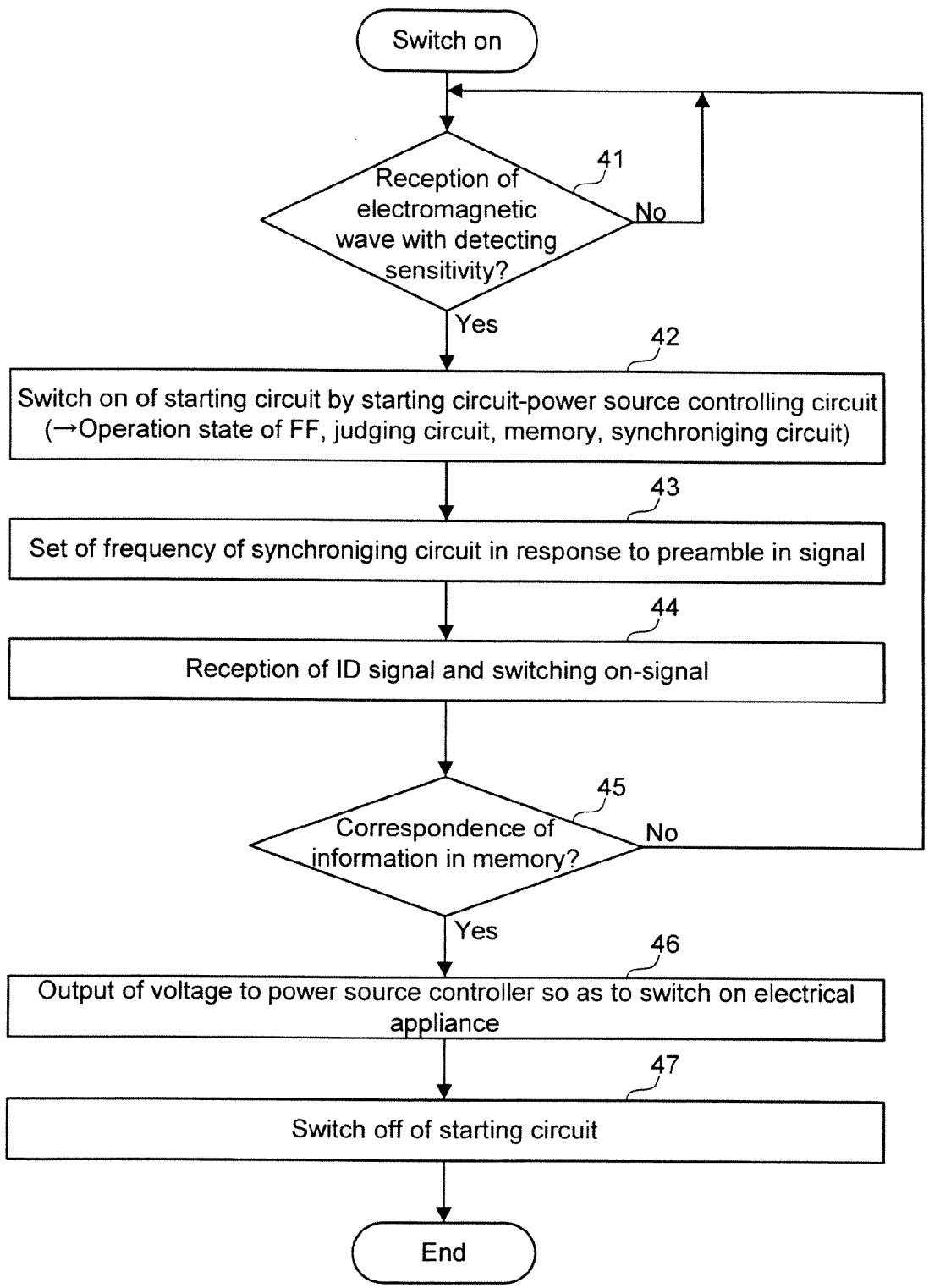
FIG. 18 is a flowchart showing the operation of the trigger signal generating device in FIG. 17.

FIG. 18 shows the flowchart relating to the operation of the trigger signal generating device shown in FIG. 17 (at the state of switch on). According to the flowchart of FIG. 17, the trigger signal generating device is set at standby state until the electromagnetic wave (radio operating signal) of which the intensity is beyond the detecting sensitivity of the device is received (Step 41). When the trigger signal generating device receives the radio operating wave, the received radio operating signal is converted into the corresponding electrical signal which is input into the starting circuit-power source controlling circuit 31 via the antenna 22, rectifier 21, the electric current generator/electric current amplifier 11 so as to switch on the starting circuit 10B (Step 42). Therefore, the synchronizing circuit 32 and the like are operated.

Then, since the output voltage of the current-voltage converter 12 is varied in accordance with the preamble of the radio operating signal, the frequency of the synchronizing circuit 32 is set so as to be synchronized with the variation of frequency of the output voltage (Step 43). Then, since the output voltage of the current-voltage converter 12 is varied in accordance with the ID information continued from the preamble and the switching information (switching on) in the radio operating wave, the variation record of the output voltage is stored in the flip-flops 33, 34, 35 (shift resistor) (Step 44). Herein, the phrase "the ID information continued from the preamble and the switching information" is referred to the operation of switch on. The memory 37 stores the information corresponding to the ID information and the switching information.

The judging circuit 36 judges whether the information (one selected from among the variation record) stored in the shift resistor (flip-flops) is matched with the information stored in the memory 37 (Step 45). If not matched, the trigger signal generating device is set at standby state (designated "N" at Step 45). If matched, the power source controller 24 is operated by the output voltage from the starting circuit 10B so as to switch on the electrical appliance 23 (Step 46). In this way, the operation of switch on of the electrical appliance 23 is finished. In this case, in view of electrical power saving, the power source of the starting circuit 10B is switched off (Step 47). For example, the power source of the starting circuit 10B is automatically switched off within a predetermined period of time which is managed in time by means of a timer (not shown). This operation can be applied for resetting the trigger signal generating device at standby state at Step 45.

Figure 19:
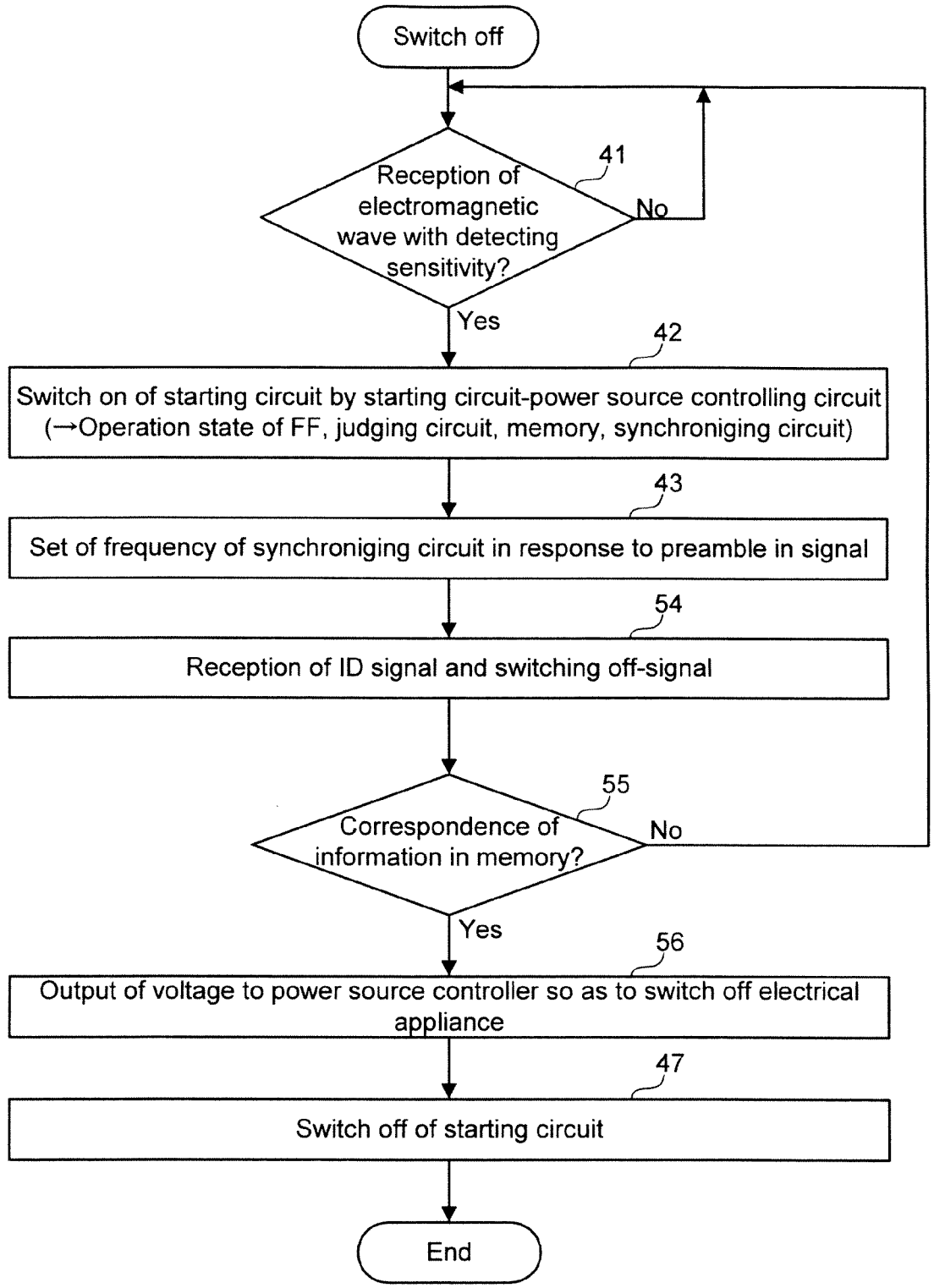
FIG. 19 is another flowchart showing the operation of the trigger signal generating device in FIG. 17.

FIG. 19 shows the flowchart relating to the operation of the trigger signal generating device shown in FIG. 17 (at the state of switch off). Like or corresponding steps are designated by the same reference characters, and thus, the explanation for the like or corresponding steps will be omitted. In this flowchart, the process for switching off the electrical appliance 23 will be described in view of the electrical power saving after the electrical appliance 23 is switched on.

In the process, steps 41 to 43 are carried out in the same manner as in FIG. 18. Then, since the output voltage of the current-voltage converter 12 is varied in accordance with the ID information continued from the preamble and the switching information (switching off) in the radio operating wave, the variation record of the output voltage is stored in the flip-flops 33, 34, 35 (shift resistor) (Step 54). Herein, the phrase "the ID information continued from the preamble and the switching information" is referred to the operation of switch off. The memory 37 stores the information corresponding to the ID information and the switching information.

The judging circuit 36 judges whether the information (one selected from among the variation record) stored in the shift resistor (flip-flops) is matched with the information stored in the memory 37 (Step 55). If not matched, the trigger signal generating device is set at standby state (designated "N" at Step 45). If matched, the power source controller 24 is operated by the output voltage from the starting circuit 10B so as to switch off the electrical appliance 23 (Step 56). In this way, the operation of switch off of the electrical appliance 23 is finished. In this case, in view of electrical power saving, the power source of the starting circuit 10B is switched off (Step 47) as shown in FIG. 18. For example, the power source of the starting circuit 10B is automatically switched off within a predetermined period of time which is managed in time by means of a timer (not shown). This operation can be applied for resetting the trigger signal generating device at standby state at Step 55.

As shown in FIGS. 18 and 19, when there are two information of "the ID information continued from the preamble and the switching information (switching on)" and "the ID information continued from the preamble and the switching information (switching off)", if two sets of judging circuits 36 and the memories 37 are provided, the two information can be easily judged. If the starting circuit 10B judges "the ID information continued from the preamble and the switching information (switching on)" and does not judges "the ID information continued from the preamble and the switching information (switching off)", another power off function which can be remotely controlled may be provided for the electrical appliance 23.

Figure 20:
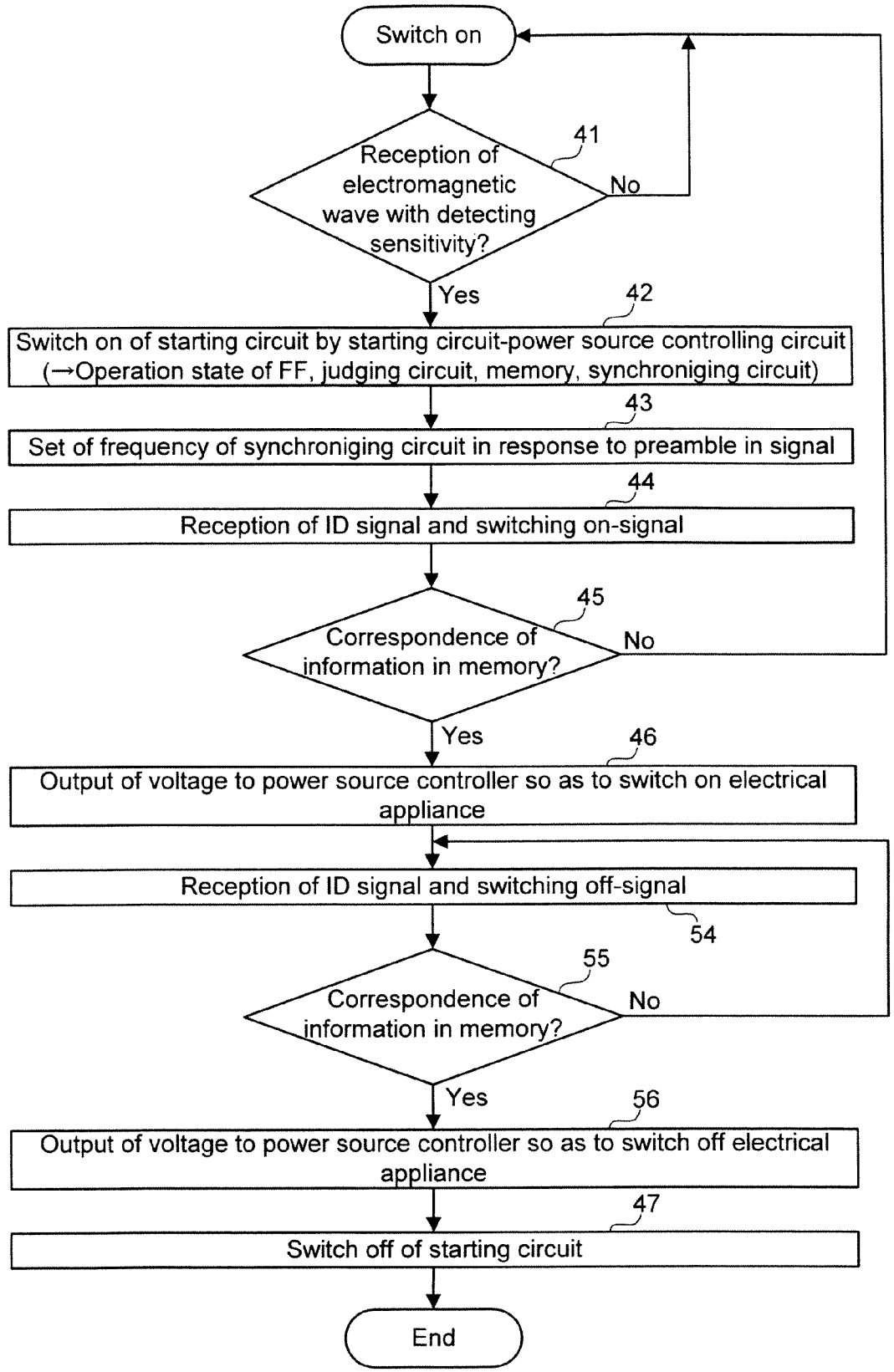
FIG. 20 is still another flowchart showing the operation of the trigger signal generating device in FIG. 17.

FIG. 20 shows the flowchart relating to the operation of the trigger signal generating device shown in FIG. 17. In this case, the trigger signal generating device is kept to be switched on and then, the wireless operation to switch off the device is input. Like or corresponding steps are designated by the same reference characters, and thus, the explanation for the like or corresponding steps will be omitted. In this flowchart, the process relating to the flowchart shown in FIG. 18 is combined with the process relating to the flowchart in FIG. 19. In the process relating to the flowchart shown in FIG. 18, the starting circuit 10B is not switched off after the electrical appliance 23 is switched on. Since it is considered that the electricity consumption of the starting circuit 10B is relatively much smaller than the electricity consumption of the electrical appliance 23 after the electrical appliance 23 is switched on, such a condition as described above can be established on the switch on of the electrical appliance 23.

Figure 21:
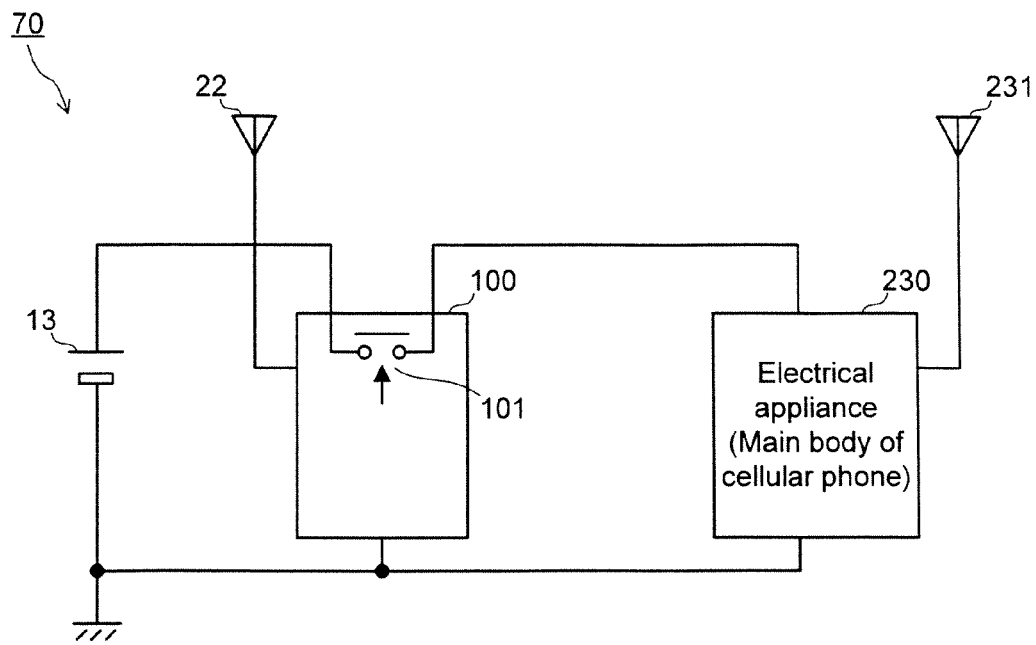
FIG. 21 is a circuit diagram of a cellular phone using the trigger signal generating device in FIG. 17.
Figure 22:
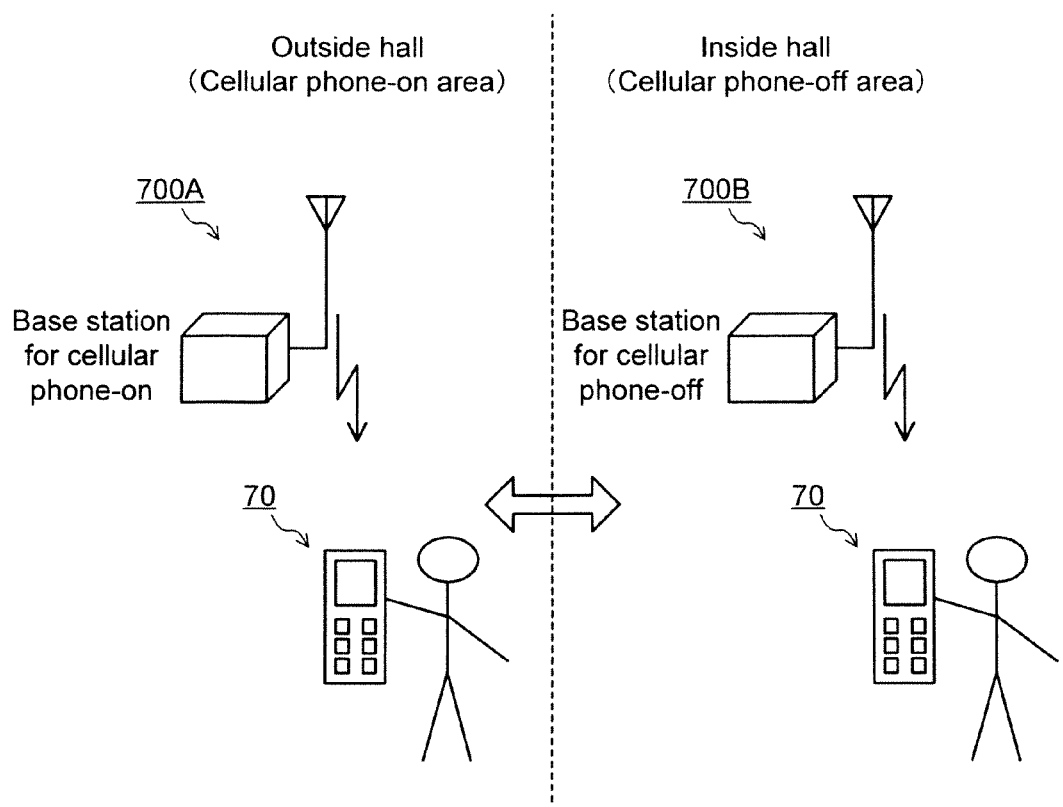
FIG. 22 shows a situation where the cellular phone in FIG. 21 is used.

An application of the trigger signal generating device shown in FIG. 17 will be described with reference to FIGS. 21 and 22. FIG. 21 shows the structure of a cellular phone which uses the trigger signal generating device shown in FIG. 17 as application.

The cellular phone 70 includes the main body 230, the antenna 231, the battery power source 13 and the power source controlling circuit 100 equipped with the antenna 22. The antenna 22 and the power source controlling circuit 100 can be configured in the same manner as shown in FIG. 17. Herein, the output signal from the judging circuit 36 is input into the power source switch 101. The power source switch 101 is located on the electric line from the battery power source 13 to the main body 230 of the cellular phone 70. The power source switch 101 is switched on and off as occasion demands.

According to this embodiment, the main body 230 of the cellular phone 70 can be switched on and off through the reception of a radio operating signal at the antenna 22. For example, as shown in FIG. 22, the cellular phone 70 can be switched off compulsively and automatically through the reception of the radio operating signal from the base station 700B for switching off the cellular phone in the area (e.g., music concert hall) which is considered as it is desired that the cellular phone 70 is switched off. The cellular phone 70 can be switched on automatically through the reception of the radio operating signal from the base station 700A for switching on the cellular phone out of the area (e.g., music concert hall).

In the case that the operation of switch off of the cellular phone 70 is performed, if the user conducts the data transmission and reception or uses application(s), the cellular phone can be configured so as to recognize the user through the warning of switching off that the cellular phone will be switched off. In this case, the cellular phone can be also configured so as to be switched off under the condition that the cellular phone stores the setting condition and/or the using condition at present by the corresponding trigger signal. If the user switches on the cellular phone manually in the switching off-area as described above, the cellular phone can be configured so as to sound a warning to the user and then, to be switched off. Then, if the user comes in the switching on-area, the cellular phone can be configured so as to be switched on and then, reinstate the stored setting condition and/or the using condition. If the user does not desire to switch on the cellular phone 70, the cellular phone can be configured so as not be automatically switched on by performing the mode setting in the cellular phone 70 in advance.

In this embodiment, the power source controlling circuit 100 is provided at the electrical line of the main body 230 of the cellular phone 70, but another controlling circuit for remote-controlling the functional portion of the main body 230 of the cellular phone 70 such as a ring alert generating unit, a wireless communicating unit or a camera unit may be provided. For example, a cellular phone with a controlling circuit for controlling a wireless communicating unit is effective in a medical center. A cellular phone with a controlling circuit for controlling a camera unit is effective in a confidential information area.

Figure 23:
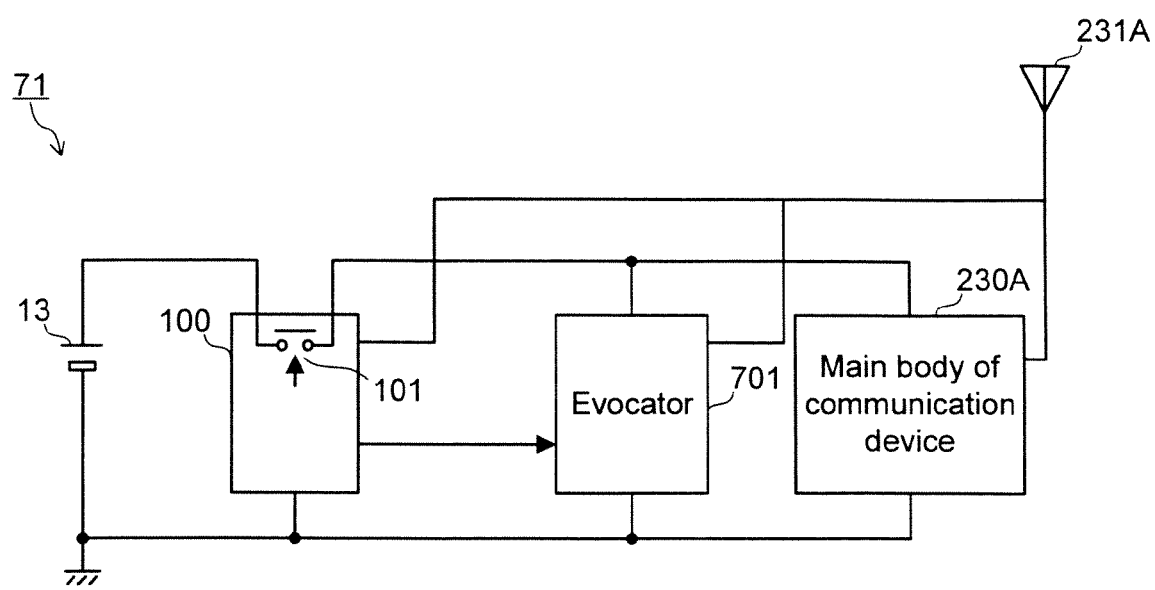
FIG. 23 is a circuit diagram of a wireless communication device using the trigger signal generating device in FIG. 17.

Another application of the trigger signal generating device shown in FIG. 17 will be described with reference to FIG. 23. FIG. 23 shows the structure of a wireless communication device (sensor network wireless communication node) which uses the trigger signal generating device shown in FIG. 17 as application.

The wireless communication device 71 includes the main body 230A, the antenna 231A, the battery power source 13A, the power source controlling circuit 100 and the evocator 701. The power source controlling circuit 100 can be configured in the same manner as shown in FIG. 17. The power source switch 101 is located on the electric line from the battery power source 13 to the main body 230A via the evocator 701. The power source switch 101 is switched on and off as occasion demands. The antennas of the power source controlling circuit 100 and the evocator 701 are common with the antenna 231A of the main body 230A. The power source controlling circuit 100 is configured so as to output a given trigger signal as an indication signal to the evocator 701.

According to this embodiment, the main body 230A and the evocator 701 of the wireless communication device 71 can be switched on and off through the reception of a radio operating signal at the antenna 231A. The evocator 701 is an electromagnetic wave-irradiating device which can irradiate the electromagnetic wave signal at the antenna 231A. When the evocator 701 is switched on and receives an indication signal from the power source controlling circuit 100, another wireless communication device, which is located apart from the wireless communication device as shown in FIG. 23 and configured in the same manner as in FIG. 23, is switched on by the electromagnetic wave signal irradiated from the evocator 701. In this way, a plurality of wireless communication devices, which are located apart from one another, can be subsequently switched on or off.

The wireless communication device in this embodiment is effective for the sensor network wireless communication node. With the sensor network wireless communication node, no electric power is supplied to the main body 230A of the wireless communication device 71 through the control of the power source controlling circuit 100 under the condition that the communicating operation is not conducted so that the main body 230A is rendered shutdown. In this case, the electricity consumption of the sensor network wireless communication node becomes almost zero. Namely, the electricity consumption of the sensor network wireless communication node can be maintained extremely low. When the communicating operation is conducted for the wireless communication node under the condition of extremely low electricity consumption, a wireless signal is supplied to the power source controlling circuit 100 so as to be switched on so that the wireless communication node can be switched on (operated). In this case, the wireless communication node can function as a normal sensor network device.

The evocator 701 can be configured so as to operate another wireless communication device instead of the wireless communication device 71. For example, when the power source controlling circuit 100 receives an evocative indication from another wireless communication device, the power source controlling circuit 100 transmits the reception signal to the evocator 701. The amplitude of the reception signal may be set larger than the amplitude of another signal to be transmitted at sensor network communication. If the above-described step is repeated, a plurality of wireless communication nodes, which are located apart from one another, are subsequently operated through the relay transmission of reception signal for the corresponding evocators. In the process, the main body 230A not intended is not required to be operated so that the wireless communication network can be established while the total electricity consumption of the wireless communication network is maintained low.

The evocator 701 is composed of an oscillator with a frequency range adapted to the receiving band range of the power source controlling circuit 100, a modulating device and an electric power amplifier. The antenna of the evocator 701 may be common with the antenna of the main body 230A or the power source controlling circuit 100. Alternately, the antenna of the evocator 701 may be provided independently.

Some embodiments are explained above. In this case, the rectifier 21 shown in FIGS. 1, 6 and 17 may be configured as the one disclosed in JP-A 2006-34085 (KOKAI) and JP-A 2006-166415 (KOKAI). In this case, the electricity consumption of the rectifier at standby state may be increased to some degree, but the sensitivity of the rectifier is increased so that the electrical appliance, which is located much apart from the rectifier, can be operated.

Although the present invention was described in detail with reference to the above examples, this invention is not limited to the above disclosure and every kind of variation and modification may be made without departing from the scope of the present invention. Some featured components disclosed in the embodiments will be combined with one another. One or some components disclosed in the embodiments will be omitted.

What is claimed is:

1. A trigger signal generating device, comprising:
    a first power source terminal and a second power source terminal;
    a first current generator, receiving an input signal, to generate a first current with a first amplitude in accordance with the amplitude of the input signal;
    a second current generator, receiving the first current of the first current generator, to generate a second current with a second amplitude, the second current being flowed from the first power source terminal to the second power source terminal;
    a current mirror circuit to amplify the second current generated from the second current generator to obtain an amplified current; and
    a trigger signal generator to convert the amplified current into a trigger signal used for triggering a trigger device, the voltage amplitude of the trigger signal being corresponding to the current amplitude of the amplified current,
    wherein both of the first and second current generators are connected to either one of the first power source terminal and the second power source terminal, and
    wherein the first current generator includes a rectifier with an nMOS transistor which is configured such that a rectified voltage is applied to a drain and gate of the nMOS transistor and a standard voltage is applied to a gate of the nMOS transistor.

2. The device as set forth in claim 1, wherein the second current generator comprises an additional current mirror circuit.

3. The device as set forth in claim 1, further comprising a plurality of additional current mirror circuits which are connected in cascade.

4. The device as set forth in claim 1,
    wherein the second current generator includes a first nMOS transistor and a second nMOS transistor which comprises the current mirror circuit,
    wherein the current mirror circuit also includes:
    a first pMOS transistor which is configured such that a drain and gate of the first pMOS transistor are connected with a drain of the second nMOS transistor and a second standard electric potential is applied to a source of the first pMOS transistor; and a second pMOS transistor which is configured such that an amplified current through the signal amplifier is output from a drain of the second pMOS transistor.

5. The device as set forth in claim 1,
    wherein the second current generator includes a transistor,
    further comprising an offset compensator for compensating an offset current flowing in a drain of the transistor.

6. The device as set forth in claim 1,
    wherein the trigger signal generator includes:
    a first nMOS transistor which is configured such that an amplified current through the signal amplifier is flowed from a drain/gate common connection of the first nMOS transistor to a source of the first nMOS transistor;
    a second nMOS transistor comprising an additional current mirror circuit with the first nMOS transistor;
    a pMOS transistor which is configured such that a drain of the pMOS transistor is connected with a drain of the second nMOS transistor and a standard electric potential is applied to a source of the pMOS transistor; and
    a biasing voltage generator which is configured such that a voltage generated between a drain/gate common connection of the first nMOS transistor and the source of the first nMOS transistor is input so as to output a nonlinear voltage as a trigger signal in response to an amplitude of the voltage to a gate of the pMOS transistor,
    wherein the trigger signal is output from a connection node between the drain of the second nMOS transistor and the drain of the pMOS transistor.

7. The device as set forth in claim 1, further comprising:
    a power source switch which is operated in response to the trigger signal so as to generate and maintain an on-state;
    a synchronizing circuit for generating a clock signal in synchronization with a variable frequency in output level of the trigger signal generator by the power supply control with the power source switch;
    a shift resistor for storing a variable hysteresis of the trigger signal generator through the input of the clock signal as a shift signal by the power supply control with the power source switch;
    a memory for storing a standard information by the power supply control with the power source switch; and
    a judging circuit for generating an indication signal to indicate that the variable hysteresis in output level is matched with the standard information through the comparison of the variable hysteresis with the standard information by the power supply control with the power source switch.

8. The device as set forth in claim 7,
    wherein the memory stores a first standard information and a second standard information as the standard information,
    further comprising an additional power source switch which is operated in response to a first indication signal indicating that the variable hysteresis in output level is matched with the first standard information in the judging circuit so as to generate and maintain an off-state and in response to a second indication signal indicating that the variable hysteresis in output level is matched with the second standard information in the judging circuit so as to generate and maintain an on-state.

9. A receiver comprising a trigger signal generating device as set forth in claim 1.

* * * * *